(12) United States Patent
Yamada et al.

(10) Patent No.: US 10,336,270 B2
(45) Date of Patent: Jul. 2, 2019

(54) VEHICLE AND MANUFACTURING METHOD THEREOF

(71) Applicant: TOYOTA JIDOSHA KABUSHIKI KAISHA, Toyota-shi, Aichi-ken (JP)

(72) Inventors: Koshi Yamada, Toyota (JP); Toshio Tanahashi, Toyota (JP); Hisashi Yabuki, Toyota (JP); Kazuhiko Omasa, Toyota (JP); Yoji Kanehara, Toyota (JP); Nagataka Sassa, Toyota (JP); Naohiko Saito, Toyota (JP); Narito Fujii, Toyota (JP); Tsuyoshi Ohkita, Toyota (JP); Masaaki Morimoto, Toyota (JP); Kazuhiro Maeda, Toyota (JP); Taro Yamashita, Toyota (JP); Fumiatsu Suzuki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 408 days.

(21) Appl. No.: 15/032,793

(22) PCT Filed: Aug. 29, 2014

(86) PCT No.: PCT/JP2014/072682
§ 371 (c)(1),
(2) Date: Apr. 28, 2016

(87) PCT Pub. No.: WO2015/064195
PCT Pub. Date: May 7, 2015

(65) Prior Publication Data
US 2016/0280162 A1    Sep. 29, 2016

(30) Foreign Application Priority Data
Oct. 30, 2013    (JP) .................................. 2013-225810

(51) Int. Cl.
*B60R 16/06* (2006.01)
*B62D 35/00* (2006.01)
(Continued)

(52) U.S. Cl.
CPC .............. *B60R 16/06* (2013.01); *B62D 35/00* (2013.01); *B62D 37/00* (2013.01); *F15D 1/0075* (2013.01)

(58) Field of Classification Search
CPC ........ B60R 16/06; B62D 35/00; B62D 37/00; F15D 1/0075
See application file for complete search history.

(56) References Cited

U.S. PATENT DOCUMENTS 3,597,668 A    8/1971 Yoshimine
3,922,214 A    11/1975 Van Cakenberghe
(Continued)

FOREIGN PATENT DOCUMENTS

CN    202524630 U    11/2012
DE    102008001103 A1    10/2009
(Continued)

OTHER PUBLICATIONS

US Patent and Trademark Office, Notice of Allowance in U.S. Appl. No. 15/018,085, dated Oct. 20, 2017, 7 pages.
(Continued)

*Primary Examiner* — Scott Bauer
(74) *Attorney, Agent, or Firm* — Hunton Andrews Kurth LLP

(57) ABSTRACT

A vehicle and a manufacturing method thereof is provided in which separation of positively charged airflow from a positively charged surface of a vehicle body can be prevented. A vehicle body is insulated from a road surface, and positive static charges accumulate on the vehicle body during propulsion. The vehicle comprises a self-discharge device that
(Continued)

10 Vehicle
12 Conductive Sheet (Potential Decreasing Member)
12A Edge
14 Bumper Cover (Resin Component, Exterior Component)
16 Rear View Mirror (External Component)
18 Head Lamp (External Component)

US 10,336,270 B2
Page 2 is adapted to decrease a positive potential of at least any one of specific points at which positively charged airflow flowing along a vehicle surface deviates therefrom, during propulsion of the vehicle, by discharging static electricity to produce negative ions according to the positive potential of the specific point.

9 Claims, 19 Drawing Sheets

(51) Int. Cl.
*F15D 1/00* (2006.01)
*B62D 37/00* (2006.01)

(56) References Cited

U.S. PATENT DOCUMENTS

| | | | |
|---|---|---|---|
| 4,155,896 A * | 5/1979 | Rennier | C09D 5/24 252/512 |
| 4,795,935 A | 1/1989 | Fujii et al. | |
| 5,095,400 A | 3/1992 | Saito | |
| 5,382,359 A | 1/1995 | Brandt | |
| 6,235,385 B1 | 5/2001 | Lee | |
| 6,640,065 B1 * | 10/2003 | Yuge | G03G 15/0258 250/324 |
| 7,248,454 B2 | 7/2007 | Takayanagi | |
| 7,684,169 B1 | 3/2010 | Larkin | |
| 7,832,528 B1 | 11/2010 | Liang | |
| 7,971,689 B2 | 7/2011 | Moore | |
| 8,641,127 B2 * | 2/2014 | Ramsay | B62D 35/00 296/180.1 |
| 9,044,916 B2 | 6/2015 | Koike et al. | |
| 9,821,862 B2 * | 11/2017 | Han | B62D 35/00 |
| 2002/0017806 A1 * | 2/2002 | Funakoshi | B29C 45/0013 296/193.09 |
| 2002/0179311 A1 | 12/2002 | Alper | |
| 2003/0183465 A1 | 10/2003 | Ikeda | |
| 2005/0018375 A1 | 1/2005 | Takayanagi | |
| 2006/0038087 A1 * | 2/2006 | Minick | B64C 23/005 244/205 |
| 2008/0036241 A1 | 2/2008 | Aisenbrey | |
| 2008/0122252 A1 * | 5/2008 | Corke | B62D 35/00 296/180.2 |
| 2008/0277272 A1 * | 11/2008 | Pierce | B01J 19/088 204/164 |
| 2009/0242334 A1 | 10/2009 | Moore | |
| 2010/0072777 A1 | 3/2010 | Ramsay | |
| 2012/0039012 A1 | 2/2012 | Nakai | |
| 2016/0059838 A1 | 3/2016 | Yamada et al. | |
| 2016/0108868 A1 | 4/2016 | Tanahashi et al. | |
| 2016/0177811 A1 | 6/2016 | Tanahashi et al. | |
| 2016/0186639 A1 | 6/2016 | Tanahashi | |
| 2016/0186703 A1 | 6/2016 | Tanahashi et al. | |
| 2016/0200270 A1 | 7/2016 | Tanahashi et al. | |
| 2016/0208748 A1 | 7/2016 | Tanahashi et al. | |
| 2016/0214453 A1 | 7/2016 | Tanahashi | |
| 2016/0223024 A1 | 8/2016 | Tanahashi et al. | |
| 2016/0230824 A1 | 8/2016 | Tanahashi et al. | |

FOREIGN PATENT DOCUMENTS

| | | |
|---|---|---|
| JP | S50-026778 | 3/1975 |
| JP | S50-26778 U | 3/1975 |
| JP | S61-194999 | 8/1986 |
| JP | H105238438 A | 9/1993 |
| JP | H10-83891 A | 3/1998 |
| JP | 2001-355524 A | 12/2001 |
| JP | 2002-104106 A | 4/2002 |
| JP | 2003-226134 A | 8/2003 |
| JP | 2006-088880 A | 4/2006 |
| JP | 2006234093 A | 9/2006 |
| JP | 2008-143476 A | 6/2008 |
| JP | 2008181694 A | 8/2008 |
| JP | 2008-273224 A | 11/2008 |
| JP | 2010-192177 A | 9/2010 |
| JP | 2012-210945 A | 11/2012 |

OTHER PUBLICATIONS

US Patent and Trademark Office, Final Office Action issued in U.S. Appl. No. 15/018,085, dated Jun. 7, 2017, 13 pages.
Chinese Patent Office, Office Action in related CN application No. CN 201480059660, dated Aug. 22, 2017, 12 pages.
Office Action issued in U.S. Appl. No. 15/018,085, dated Dec. 14, 2016.

* cited by examiner

10 Vehicle
12 Conductive Sheet (Potential Decreasing Member)
12A Edge
14 Bumper Cover (Resin Component, Exterior Component)
16 Rear View Mirror (External Component)
18 Head Lamp (External Component)

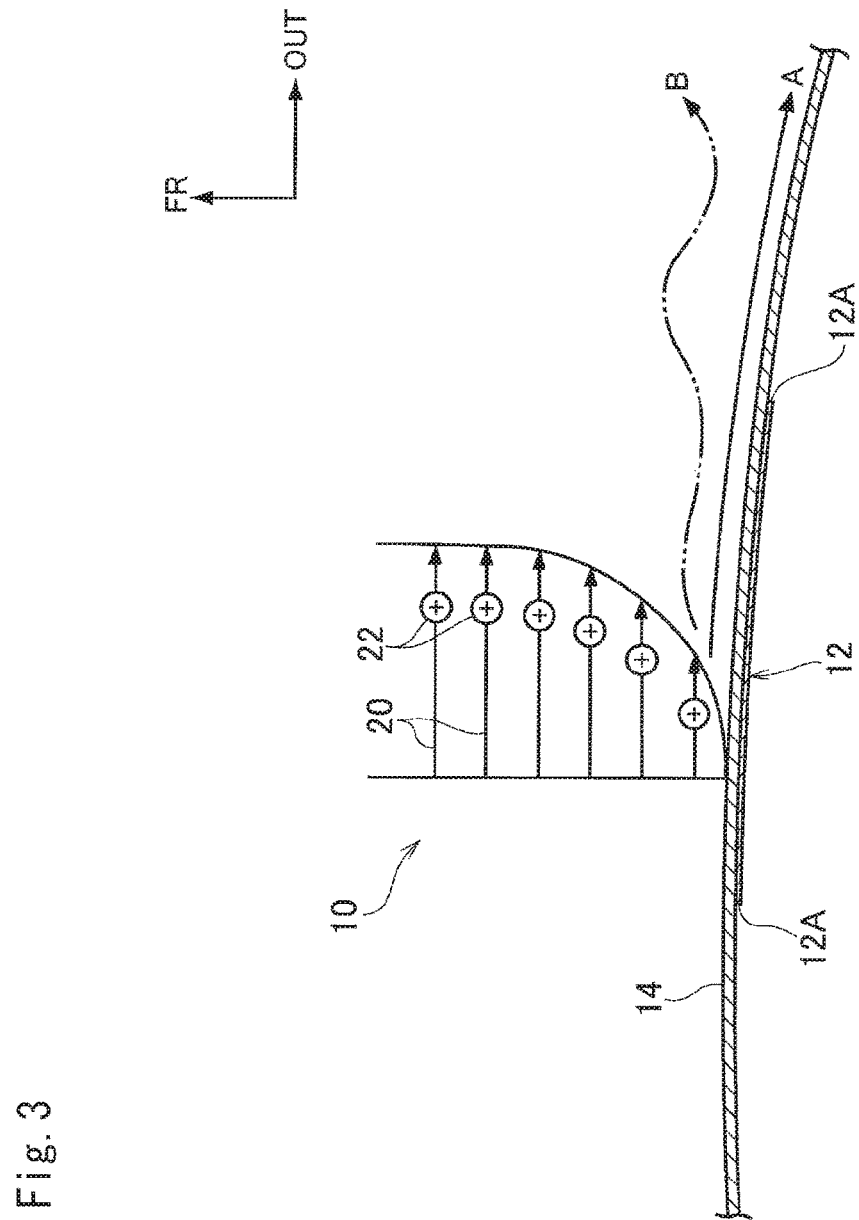

VEHICLE AND MANUFACTURING METHOD THEREOF

CROSS-REFERENCE TO RELATED APPLICATIONS

This is a national phase application based on the PCT International Patent Application No. PCT/JP2014/072682 filed Aug. 29, 2014, claiming priority to Japanese Patent Application No. 2013-225810 filed Oct. 30, 2013, the entire contents of both of which are incorporated herein by reference.

TECHNICAL FIELD

This invention relates to the art of an automobile.

BACKGROUND ART

Japanese Patent Laid-Open No. 2006-88880 describes an air current separation reducing sheet to be applied to the exterior of an automobile provided with a plurality of recesses formed in the surface.

Japanese Patent Laid-Open Nos. 2003-226134 and 2008-273224 individually describe an automobile in which discharge needles connected to a high-voltage generator are arranged in an air duct guiding air from an air conditioner to a vehicle interior and a door trim so that ionized air resulting from corona discharge from a leading end of the discharge needle is supplied to the vehicle interior.

However, the silicon rubber sheet having an uneven surface taught by JP-A-2006-88880 may cause disfigurement of a vehicle if attached to a vehicle surface. In addition, the silicon rubber sheet may be electrostatically charged easily during propulsion of the vehicle. Consequently, air may be separated from the sheet attached to the vehicle surface by repulsive force acting between the ionized air and static electricity on the sheet.

As described, Japanese Patent Laid-Open Nos. 2003-226134 and 2008-273224 individually describe an automobile in which ionized air is supplied to the vehicle interior. However, those prior art documents do not focus on a relation between the static electricity accumulating on the vehicle surface and aerodynamic characteristics of airflow flowing along the vehicle surface. Basically, air is charged positively and hence repulsive force acts between the airflow and the vehicle surface. Consequently, air may be separated from the vehicle surface by such repulsive force.

If the airflow is separated from the vehicle surface, desired aerodynamic characteristics of the vehicle may not be achieved and consequently driving performance of the vehicle may be degraded.

DISCLOSURE OF THE INVENTION

The present invention has been conceived nothing the foregoing technical problems, and it is therefore an object of embodiments of the present invention is to provide a vehicle which can prevent separation of positively charged airflow from a positively charged surface of a vehicle body during propulsion, and a manufacturing method thereof.

During propulsion of the vehicle, positive static charges accumulate on a vehicle body insulated from a road surface. In order to achieve the above-explained objective, according to one aspect of the present invention, the vehicle is provided with a self-discharge device that is adapted to decrease a positive potential of at least any one of specific points at which positively charged airflow flowing along a vehicle surface deviates therefrom, during propulsion of the vehicle, by discharging static electricity to produce negative ions according to the positive potential of the specific point.

The above-mentioned specific point may include a width center point of at least any one of an inner surface and an outer surface of a vehicle body.

The above-mentioned specific point may further include symmetrical points in a width direction across the width center.

The above-mentioned specific point may further include a plurality of points situated keeping predetermined intervals along a flowing direction of the airflow.

The above-mentioned specific point may further include a portion of a member made of resin material.

The self-discharge device may include a potential decreasing member adapted to cause a self-discharge according to energy of positive static electricity on the specific point and in the vicinity thereof. The potential decreasing member may be attached to the specific point of a component of the vehicle body at which the positively charged airflow flowing along the vehicle surface deviates therefrom.

The potential decreasing member may include a conductive metal sheet having a sharp edge or a protrusion to cause the self-discharge.

The potential decreasing member may be attached to a backside of an outer surface to be exposed to the airflow flowing thereon.

The specific point may further include a grounding portion of a battery, and the self-discharge device may be adapted to decrease negative potential of the grounding portion.

According to another aspect of the present invention, there is provided a manufacturing method of a vehicle in which positive static charges accumulate on a vehicle body insulated from a road surface during propulsion of the vehicle. The manufacturing method comprises determining a point at which control stability of the vehicle can be improved by preventing separation of positively charged airflow flowing along a vehicle surface during propulsion of the vehicle; and attaching a self-discharge device that is adapted to decrease a positive potential to said point by discharging static electricity to produce negative ions according to the positive potential of said point.

The point at which control stability of the vehicle can be improved by preventing separation of positively charged airflow flowing along a vehicle surface during propulsion of the vehicle may be determined at a point on a width center of at least any one of an inner surface and an outer surface of a vehicle body.

The point at which control stability of the vehicle can be improved by preventing separation of positively charged airflow flowing along a vehicle surface during propulsion of the vehicle may also be determined at symmetrical points in a width direction across the width center of the vehicle.

Optionally, a plurality of the self-discharge devices may be attached to the vehicle body while keeping predetermined intervals along a flowing direction of the airflow.

Thus, the vehicle according to the present invention is provided with the self-discharge device adapted to decrease a positive potential of the specific point at which positively charged airflow flowing along the vehicle surface deviates therefrom during propulsion of the vehicle, by discharging static electricity to produce negative ions according to the positive potential of the specific point. In the vehicle, therefore, the static electricity accumulating on the vehicle surface can be eliminated to decrease the positive potential so that a repulsive force acting between the positively charged airflow and the positively charged vehicle surface can be damped. That is, separation of the airflow from the vehicle surface can be prevented during propulsion of the vehicle. For this reason, deterioration in aerodynamic characteristics of the vehicle can be avoided to improve a traveling stability of the vehicle.

In the vehicle, deterioration in aerodynamic characteristics in a pitching direction may be prevented by decreasing the positive potential at the width center point. For this reason, change in a vertical force applied to wheels toward a road surface can be prevented to ensure acceleration performance and steering stability.

In the vehicle, deterioration in aerodynamic characteristics in the rolling direction and a yawing direction may be prevented by decreasing the positive potential at symmetrical points in the width direction across the width center. For this reason, deterioration in the travelling performance such as the control stability can be prevented.

Deterioration in the travelling performance such as the control stability can be prevented more certainly by decreasing positive potentials of a plurality of points while keeping predetermined intervals along a flowing direction of the airflow.

Specifically, the static electricity of the specific point of the vehicle body and in the vicinity thereof can be electrically neutralized by arranging the potential decreasing member adapted to cause a self-discharge according to energy of positive static electricity on the specific point. Consequently, repulsive force acting between the positively charged airflow and the positively charged surface of the vehicle body is damped so that the airflow is allowed to flow without being disturbed and separated from the specific point. For this reason, air resistance and vibrations resulting from air disturbance can be reduced to improve the control stability.

In addition, the electrical neutralization can be ensured without increasing weight of the vehicle by using the conductive metal sheet having a sharp edge or a protrusion as the potential decreasing member.

Further, the potential decreasing member may be arranged on the backside of an outer surface to be exposed to the airflow flowing thereon without causing disfigurement of the vehicle.

BRIEF DESCRIPTION OF THE DRAWINGS

FIG. 3 is a cross-sectional view along III-III line in FIG. 1 showing an airflow flowing thereon.

FIG. 7(a) and FIG. 7(b) are explanatory illustrations showing locations of the self-discharge devices, in which FIG. 7(a) is a perspective view from the front side of the vehicle showing locations of the self-discharge devices, and FIG. 7(b) is a perspective view from the rear side of the vehicle showing locations of the self-discharge devices.

FIG. 8(a) and FIG. 8(b) are explanatory illustrations showing locations of the self-discharge devices, in which FIG. 8(a) is a perspective view from the front side of the vehicle showing locations of the self-discharge devices attached to the lower side of an outer surface of a windshield and to the opposite surface to be protected from airflow flowing along the vehicle surface, and FIG. 8(b) is a cross-sectional view thereof.

FIG. 10(a) and FIG. 10(b) are cross-sectional views showing self-discharge device attached to a roof liner, in which FIG. 10(a) is a cross-sectional view showing the self-discharge device attached to a roof liner to decrease potential of a ceiling through the roof liner and an air layer, and FIG. 10(b) is a cross-sectional view showing the self-discharge device attached to the roof liner to decrease potential of a ceiling through the roof liner contacted thereto.

FIG. 11(a) and FIG. 11(b) are is an explanatory illustrations showing locations of the self-discharge devices, in which FIG. 11(a) is a perspective view from the rear side of a sedan type vehicle showing locations of the self-discharge devices attached to the lower side of an outer surface of a rear window to be protected from airflow flowing along the vehicle surface, and FIG. 11(b) is a cross-sectional view thereof.

FIG. 12(a) and FIG. 12(b) are explanatory illustrations showing locations of the self-discharge devices, in which FIG. 12(a) is a perspective view from the rear side of a hatchback type vehicle showing locations of the self-discharge devices attached to the lower side of an outer surface of a rear window to be protected from airflow flowing along the vehicle surface and to a width center of a rear spoiler from which the airflow is separated, and FIG. 12(b) is a cross-sectional view thereof.

FIG. 13(a) and FIG. 13(b) are explanatory illustrations showing locations of the self-discharge devices, in which FIG. 13(a) is a perspective view from the rear side of a one-box type vehicle showing locations of the self-discharge devices attached to the lower side of the outer surface of the rear window to be protected from the airflow flowing along the vehicle surface and to the width center of the rear spoiler from which the airflow is separated, and FIG. 13(b) is a cross-sectional view thereof.

DESCRIPTION OF THE PREFERRED EMBODIMENT(S)

Hereinafter, embodiments of the present invention will be explained in more detail with reference to the accompanying drawings. In a vehicle 10 shown in FIG. 1, conductive sheets 12 as self-discharge devices are attached to a reverse side of an outer surface of an exterior component at specific points from which airflow deviate from the outer surface. Accordingly, the conductive sheet 12 serves as the claimed potential decreasing member. Specifically, the airflow flowing along the outer surface of the vehicle 10 has a tendency to deviate from the outer surface at a point depressed inwardly from a flowing direction of the airflow. More specifically, in the vehicle 10, the airflow deviates from a lateral face at a point bent inwardly, from a bonnet or a roof at a point bent downwardly, and from a lower face of an undercover at a point between a descending face and a parallel face and at a point between an ascending face and a parallel face. In addition, the airflow also deviates from the outer surface of the vehicle 10 at a point bent outwardly to form a step.

Figure 1:
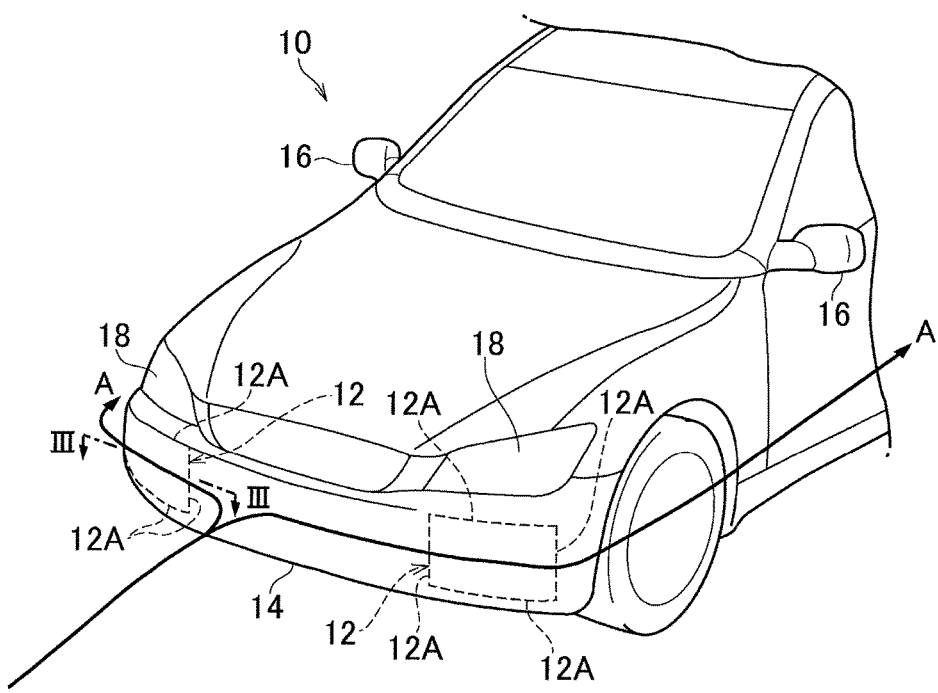
FIG. 1 is a perspective view showing a front part of the vehicle.

In the vehicle 10 shown in FIG. 1, positive static charges may accumulate on the exterior component by an internal factor such as friction between the outer surface and external airstream and friction resulting from repetition of contact between an outer surface of a tire and a road surface, and an external factor such as an external potential. For example, the positive static charges accumulate on a front bumper cover 14, a rear view mirror 16, a head lamp 18, a door knob (not shown), a tail lamp (not shown), an antenna fin (not shown), a resin side door, a resin back door and so on. Those exterior components are made of resin, and hence the positive static charges may accumulate thereon to increase a positive potential. The conductive sheet 12 is provided with a sharp edge to serve as a self-discharge device, and it is effective to attach the conductive sheet 12 to those specific points of the resin exterior components.

Figure 2A:
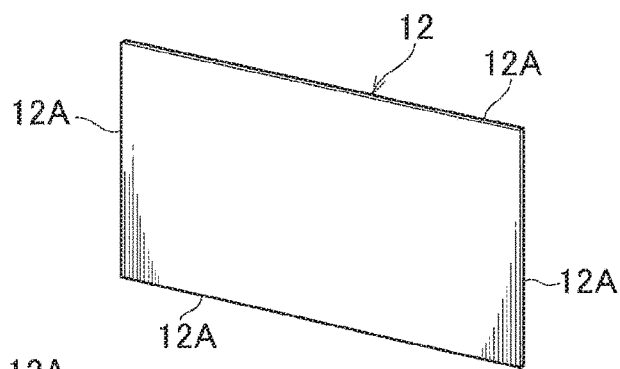
FIG. 2(a) to FIG. 2(d) are perspective views showing a conductive sheet having various kinds of corners.

As shown in FIGS. 1 and 2(A), according to the preferred embodiment, the conductive sheets 12 may be attached to an inner surface or a back face of the bumper cover 14 at the points in the vicinity of width ends symmetrically where the airflow may deviate from the outer surface thereof. For example, the bumper cover 14 is made of acrylonitrile butadiene styrene copolymer resin (i.e., ABS resin).

For example, in order to cause corona discharge according to the potential, the conductive sheets 12 is formed into a rectangular shape having a sharp edge on its periphery. In the example shown in FIG. 2(a), each corner and each lateral edge of the rectangular conductive sheets 12 individually serves as an edge 12A at which the potential is concentrated so that the corona discharge may be expedited at the edge 12A. For example, the conductive sheets 12 may be made of gold, silver, copper, aluminum etc. (i.e., conductive metal material). If aluminum is used as the material of the conductive sheets 12, it is preferable to apply an anti-oxidizing processing to the conductive sheets 12 to prevent deterioration in electric conductivity resulting from oxidation. Specifically, the conductive sheets 12 is an adhesion tape comprising a conductive metal film and a conductive adhesive layer, and for example, the conductive sheets 12 may be cut out of a conductive aluminum reel tape in such a manner as to form the edge 12A.

[Action]

Action of the preferred embodiment will be explained hereinafter. In recent years, many exterior components made of resin have been used in the vehicle 10 to reduce weight of the vehicle and to improve workability. However, since an electric resistance of resin is larger than that of metal, an outer surface of the resin member is charged significantly by airflow. Specifically, an electric potential of the external component may be changed approximately from 100V to 4000V before and after propulsion of the vehicle 10. Turning to FIG. 3, there is shown a cross-section of the external component for explaining a change in the airflow flowing along the surface of the positively charged exterior component. In FIG. 3, arrow A represents the airflow of the case in which the exterior component is not electrically charged, and arrow B represents the airflow of the case on which the exterior component is electrically charged. As indicated in FIG. 3, the airflow 20 is basically charged with positive charge 22 and the bumper cover 14 is also charged positively during propulsion of the vehicle 10. For this reason, repulsive force acts between the airflow and the surface of the vehicle 10.

According to the preferred embodiment, the conductive sheet 12 is attached to the inner surface of the bumper cover 14 so that the surface of the bumper cover 14 can be prevented from being electrically charged by the following principle. During propulsion of the vehicle 10, positively charged airflow flows along the surface of the vehicle body, and a tread of the tire is brought into contact to the road surface and isolated away from the road surface repeatedly. Consequently, positive static charges accumulate gradually on the vehicle body by such internal and external factors. In this situation, positive static charges also accumulate on the conductive sheets 12 attached to the above-explained specific points, and the potential is concentrated on the sharp edge 12A. As a result, negative ions (or minus ions) are attracted to the conductive sheets 12 and corona discharge is caused by the conductive sheets 12. That is, the conductive sheet 12 discharges positive static electricity without being charged by an electrical equipment such as a battery. At the same time, accumulation of static electricity on the point to which the conductive sheet 12 attached is neutralized to decrease positive potential so that repulsive force acting between the airflow and the bumper cover 14 is damped. As a result of such attraction of the negative ions and reduction in the repulsive force resulting from corona discharge, separation of the airflow flowing along the surface of the vehicle body can be prevented within an area approximately around 150 to 200 mm from the conductive sheet 12. For this reason, disturbance of the airflow and change in air pressure can be prevented at the specific point of the surface of the vehicle body and in the vicinity thereof. Specifically, the airflow will not flow as indicated by the arrow B but flows as indicated by the arrow A on the surface of the bumper cover 14. For this reason, designed aerodynamic characteristics can be ensured to improve a driving performance, a driving stability, a braking performance, a riding comfort etc. of the vehicle 10 from an extremely low sped to a high speed. In addition, since the vehicle body is electrically charged during propulsion especially at high speed, the self-discharge is promoted at high speed range to improve the driving performance.

Thus, the conductive sheets 12 are arranged on the inner surface of the bumper cover 14 without causing disfigurement of the vehicle. In addition, the conductive sheet 12 serving as the potential decreasing member will not increase a weight of the vehicle 10. Further, since an alteration in design of vehicle 10, a temporal change in the configuration by a control device, a flow control device for controlling air intake and discharge are not required, the preferred embodiment can be carried out without increasing a cost.

Another Embodiment

Figure 2B:
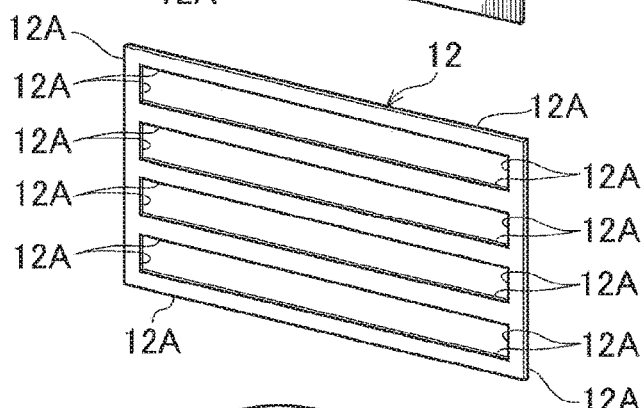
Figure 2C:
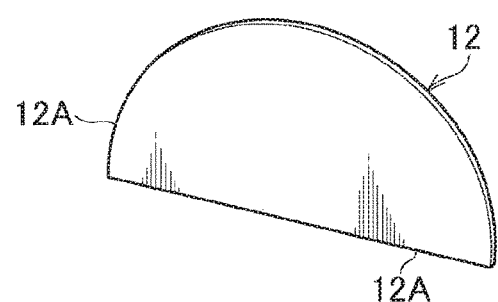
Figure 2D:
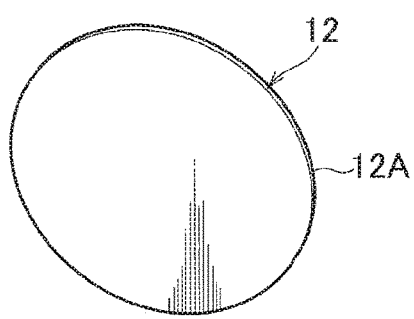

In order to expedite corona discharge, as illustrated in FIG. 2(b), the conductive sheet 12 may also be formed in such a manner as to have grids to increase the edge 12A. Likewise, the conductive sheet 12 may also be formed into a semicircular shape as illustrated in FIG. 2(c), and a circular shape as illustrated in FIG. 2(d) having the edge 12A on an outer circumferential edge. Optionally, since the conductive sheet 12 has a certain thickness, it is possible to knurl the edge 12A. In addition, the edge 12A may also be formed on a surface of the conductive sheet 12 by knurling the surface of the conductive sheet 12.

The potential decreasing member may be arranged not only on the inner face of the exterior component but also on the outer surface of the vehicle. In addition, instead of the above-explained conductive sheet 12, the potential decreasing member may also be made of conductive polymer molecule such as polyaniline, polypyrrole and polythiophene, conductive plastic, conductive coating material, metal plating, and metal member such as aluminum garnish (not shown).

Although the above exemplary embodiments of the present application have been described, it will be understood that the present application should not be limited to the described exemplary embodiments, and various changes and modifications can be made within the spirit and scope of the present application.

Figure 4:
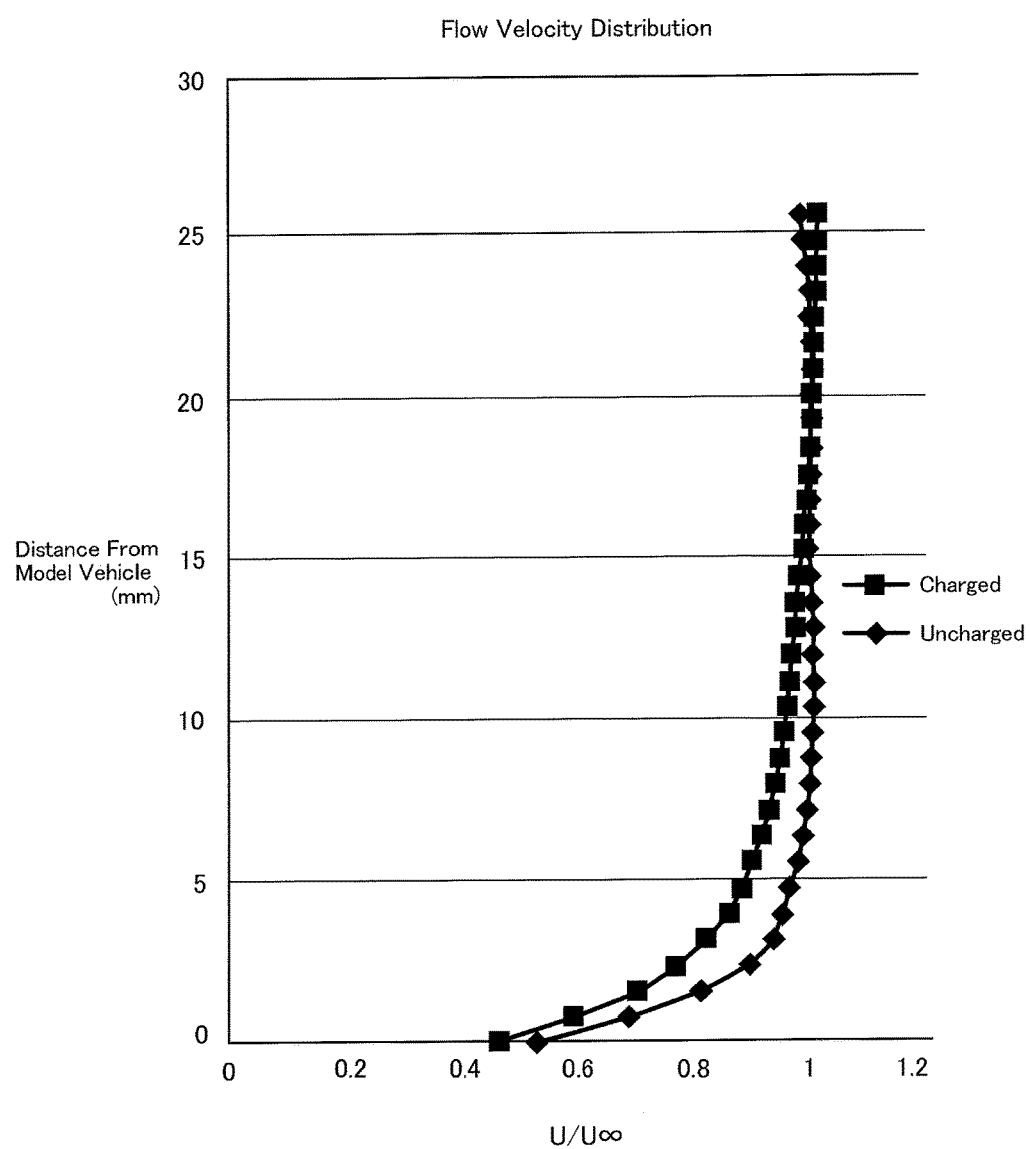
FIG. 4 is a graph indicating measurement results of flow velocity distributions in a direction perpendicular to a surface of a model vehicle.

Here will be explained an effect of neutralizing the static electricity accumulated on the vehicle body. Turning to FIG. 4, there are shown measurement results of flow velocity distribution in a direction perpendicular to a positively charged surface of a model vehicle. In FIG. 4, the vertical axis represents a distance from the surface of the model vehicle, and the horizontal axis represents a ratio of a flow velocity U of the air flowing on the surface of the model vehicle to a flow velocity U∞ measured from a predetermined distance (U/U∞). Square dots represent measured values of flow velocity of the air flowing on the positively charged surface of the model vehicle, and rhombus dots represent measured values of flow velocity of the air flowing on the uncharged surface of the model vehicle.

As can be seen from FIG. 4, a thickness of a boundary layer (i.e., a distance from the vehicle surface at which the ratio U/U∞ is substantially 1) of the case in which the surface of the model vehicle is positively charged (+) is thicker than that of the case in which the surface of the model vehicle is not charged. This means that the airflow is isolated further away from the positively charged (+) surface of the model vehicle in comparison with the case in which the surface is not charged. This is because the airflow is basically charged positively (+) and hence the positively charged airflow and the positively charged surface of the vehicle repel each other. As a result of thus neutralizing the static electricity on the surface of the vehicle body to decrease positive potential, the airflow may be changed from that of the case in which the vehicle body is charged positively (+) from that of the case in in which the vehicle body is not charged positively (along the vehicle body). That is, separation of the airflow from the outer surface of the vehicle body can be prevented.

Figure 5A:
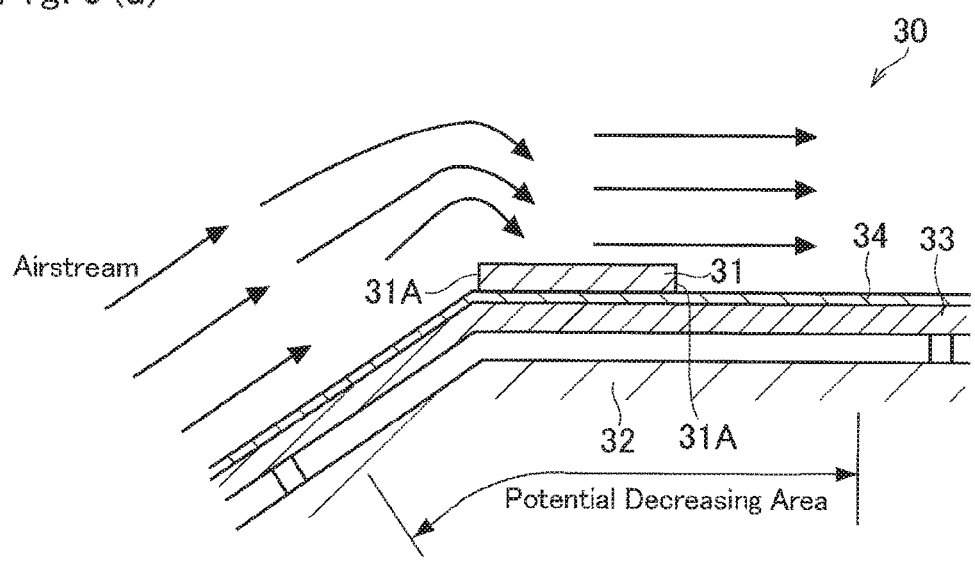
FIG. 5(a) is an explanatory illustration showing the self-discharge device attached to an outer surface of the vehicle.
Figure 5B:
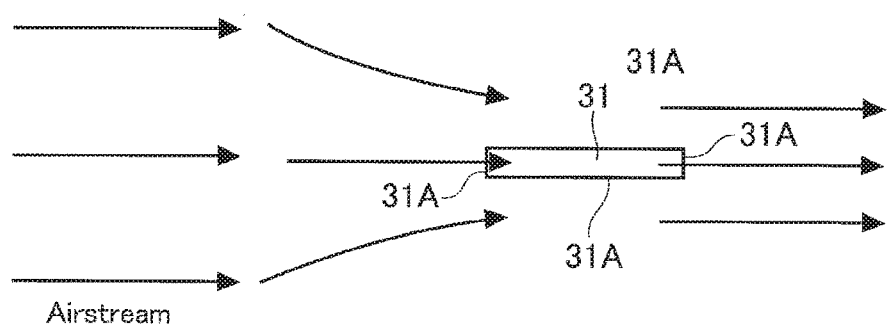
FIG. 5(b) is a top view thereof.

A point at which the positively (+) charged airflow is separated from the surface of the model vehicle, and a degree of such separation of the airflow are changed depending on positive (+) potential of the model vehicle. According to the preferred embodiment, therefore, the vehicle is configured to prevent or avoid such separation of the airflow by neutralizing the positive (+) static electricity on the vehicle body. One example of such configuration is shown in FIG. 5, and in FIG. 5, FIG. 5(a) is a cross-sectional view and FIG. 5(b) is a top view. In the example shown in FIG. 5, a self-discharge neutralizing device (as will be simply called the "self-discharge device" hereinafter) 31 adapted to cause corona discharge according to an energy of positive static electricity on a vehicle body 30 is attached to an outer surface of the vehicle body 30. In the vehicle body 30, a steel plate 32 for enhancing stiffness is covered by a cover member 33 made of resin, and the cover member 33 is coated with a glass coating 34. Material of the vehicle body 30 may be selected from any of resin, glass, iron, aluminum etc.

During propulsion of the vehicle, positive (+) static charges may accumulate on the vehicle body 30 for a variety of reasons, e.g., friction between a surface of the vehicle body 30 and external airstream or friction between an air duct and air flowing therethrough. The positive (+) static charges may also accumulate on the vehicle body 30 due to friction between slidable members of a prime mover such as an engine and a motor, a transmission, a suspension etc. The positive (+) static charges may also accumulate on the vehicle body 30 due to friction between the tire and the road surface, and an electrical spark resulting from detachment of the tire from the road surface. In addition, the positive (+) static charges may also accumulate on the vehicle body 30 due to electrical activity of electrical equipment and an influence of external electrical cables etc.

The tire is made of insulating material (whose electrical conductivity is small) such as rubber, and hence positive (+) static charges accumulate on the vehicle body 30. The static charges on the vehicle body 30 partially concentrate locally on the outer surface of the vehicle body 30 depending on conductivity. That is, positive (+) static electricity may accumulate even on a metal panel made of material of relatively high electrical conductivity due to electrical resistance at a joint portion. According to the preferred embodiment, therefore, the specific point includes points of surfaces of the made of material other than resin such as metal, glass, rubber, coating and so on.

In the example shown in FIG. 5, the self-discharge device 31 is attached to an outer surface of the vehicle body 30, more specifically, to an outer surface of the coating 34 so as to discharge positive (+) static electricity accumulate on the outer surface of the vehicle body 30. The self-discharge device 31 as a conductive member is adapted to cause corona discharge according to positive static electricity accumulating on the self-discharge device 31 and in the vicinity thereof. The self-discharge device 31 may be made of same material as the aforementioned conductive sheet 12 such as aluminum sheet and conductive coating material. As well known in the art, corona discharge is caused at a sharp point of a charged object. Therefore, the self-discharge device 31 is preferably formed in such a manner as to have a plurality of projections. To this end, given that sheet material is used to form the self-discharge device 31, the self-discharge device 31 may be cut out of the sheet material in such a manner as to form an uneven edge on its periphery. Optionally, projections may also be formed on a surface of the self-discharge device 31 by coating the surface of the self-discharge device 31 with coating material containing metal powder. Alternatively, the surface of the self-discharge device 31 may also be knurled to form the projections. The self-discharge device 31 shown in FIG. 5 is made of aluminum foil having a predetermined thickness, and provided with a knurled edge 31A on its periphery.

Here will be explained an effect of neutralizing the positive (+) static electricity accumulated on the surface of the vehicle body 30 by the self-discharge device 31 attached to the surface of the vehicle body 30. During propulsion of the vehicle, air flows tangentially to the outer surface of the vehicle body 30 by the Coanda effect. However, given that the vehicle body 30 is charged positively (+), the external airflow that is basically charged positively (+) will be repelled from the outer surface of the vehicle body 30. An increase in positive charges on the vehicle body 30 that causes repulsion of the airflow away from the vehicle body 30 will result in corona discharge from the self-discharge device 31. Consequently, the positive (+) potential on the self-discharge device 31 and in the vicinity thereof are decreased, and the positive potential (+) on the surface of the vehicle body 30 is also decreased. As a result of such reduction in the positive (+) potentials on the self-discharge device 31 and in the vicinity thereof, the repulsive force acting between the airflow and the surface of the vehicle body 30 is damped. In addition, negative ions around the self-discharge device 31 are increased as a result of increasing the charges on the self-discharge device 31, and the negative ions thus produced are attracted to the positively charged self-discharge device 31 and in the vicinity thereof. Consequently, the airflow containing negative ions is attracted to the point of the surface of the vehicle body 30 to which the self-discharge device 31 is attached. Thus, according to the preferred example, separation of the external airflow of the vehicle from the outer surface of the vehicle body 30 can be avoided. Specifically, the positive potential can be effectively reduced within an area approximately from 150 mm to 200 mm around the self-discharge device 31.

As a result of thus preventing the separation of the external airflow from the outer surface of the vehicle body 30, deterioration in aerodynamic characteristics of the vehicle in the pitching direction, the rolling direction and the yawing direction can be prevented. For this reason, deterioration in aerodynamic characteristics can be prevented especially effectively in the rolling direction to improve a turning performance and a traveling stability of the vehicle. For example, even when the vehicle making a turn receives air diagonally, a difference between downforces in the inner wheel side and the outer wheel side can be reduced to improve a turning performance of the vehicle. In addition, since the positive potential can be reduced within the predetermined area around the self-discharge device 31, the above-explained effect may also be achieved even under a condition that the vehicle receives crosswind during propulsion to improve a turning performance and a traveling stability.

Figure 6A:
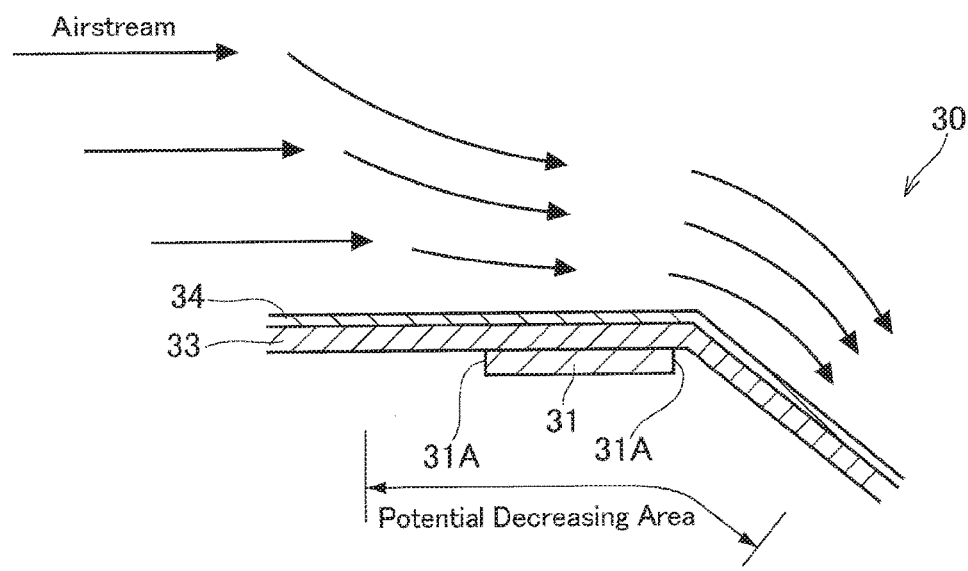
FIG. 6(a) is an explanatory illustration showing the self-discharge device attached to an opposite surface to the outer surface of the vehicle.
Figure 6B:
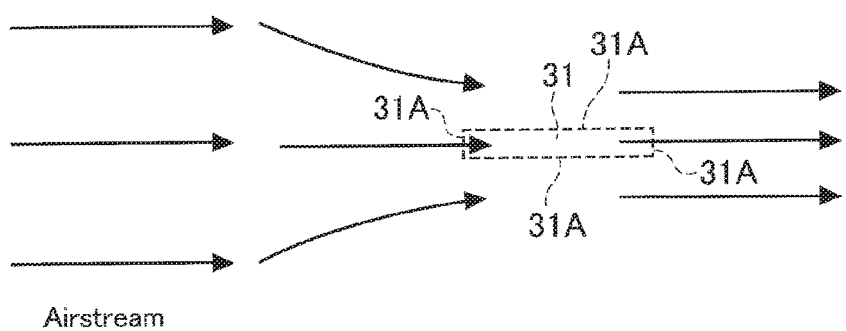
FIG. 6(b) is a top view thereof.

Thus, the positive (+) static electricity can be neutralized within the predetermined area around the self-discharge device 31, and an only requirement of such neutralization is an existence of air. That is, as illustrated in FIG. 6, the positive (+) static electricity accumulating on the vehicle body 30 may also be neutralized by attaching the self-discharge device 31 to a backside of the outer surface of the vehicle body 30 where the self-discharge device 31 is to be exposed. In FIG. 6, FIG. 6(*a*) is a cross-sectional view and FIG. 6(*b*) is a top view. In the example shown in FIG. 6, a predetermined clearance is maintained between the steel plate 32 and the cover member 33 to allow air to flow therethrough. If the self-discharge device 31 is attached to the inner surface of the cover member 33, the above-explained effect can be achieved without causing disfigurement of the vehicle.

According to the foregoing examples, the self-discharge device 31 is thus attached to the outer surface or the inner surface of the vehicle body 30. However, the self-discharge device 31 may also be attached to other points at which separation of airflow may occur. Specifically, the self-discharge device 31 may also be attached to the point at which the airflow flowing along the surface of the vehicle body 30 deviates from the surface of the vehicle body 30. More specifically, the self-discharge device 31 may also be attached to the point at which the outer surface of the vehicle body 30 is bent at an angle larger than a predetermined angle with respect to a flowing direction of the airflow. Such points at which separation of the airflow occur may be found in advance by an experiment took place in a wind tunnel or determined based on a configuration of the outer surface of the vehicle body 30. That is, the self-discharge device 31 may be attached to the point at which separation of the airflow from the surface of the vehicle body 30 to improve the control stability. By thus determining the points to attach the self-discharge devices 31, number of the self-discharge devices 31 may be reduced while ensuring desired aerodynamic characteristics in the pitching direction, the rolling direction and the yawing direction.

According to the manufacturing method of the preferred embodiment, therefore, the above-explained points at which separation of the airflow may occur are specified using a vehicle model or a prototype vehicle. In addition, the points effective to improve the control stability by attaching the conductive sheet 12 or the self-discharge device 31 thereto to decrease positive potential are specified based on a result of experimentation. During manufacturing process of the vehicle 10, the conductive sheets 12 or the self-discharge devices 31 are attached to the point possible to decrease positive potential thus specified.

Figure 7A:
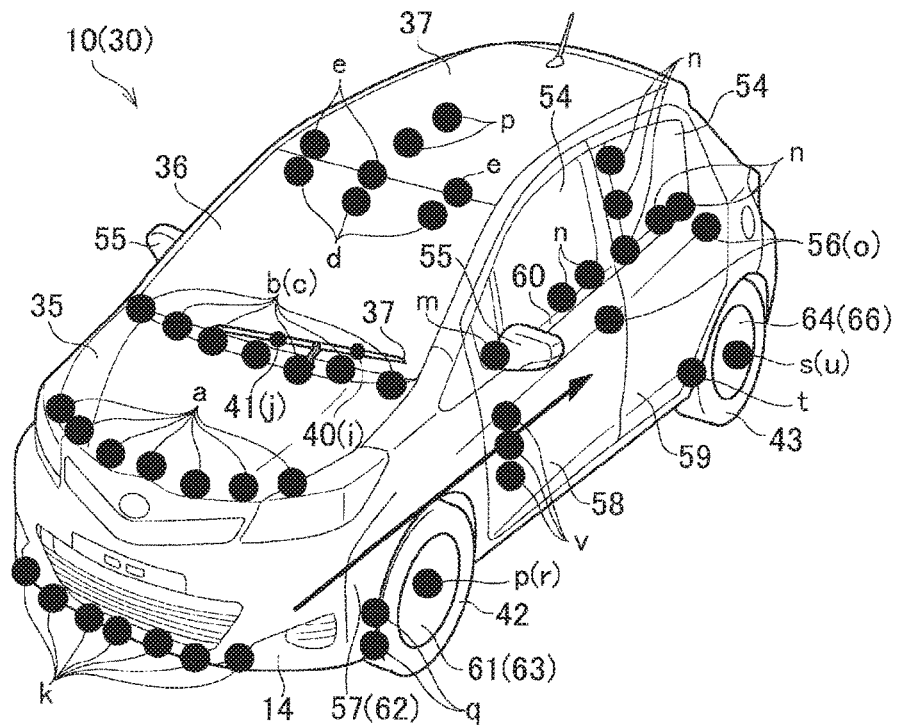
Figure 7B:
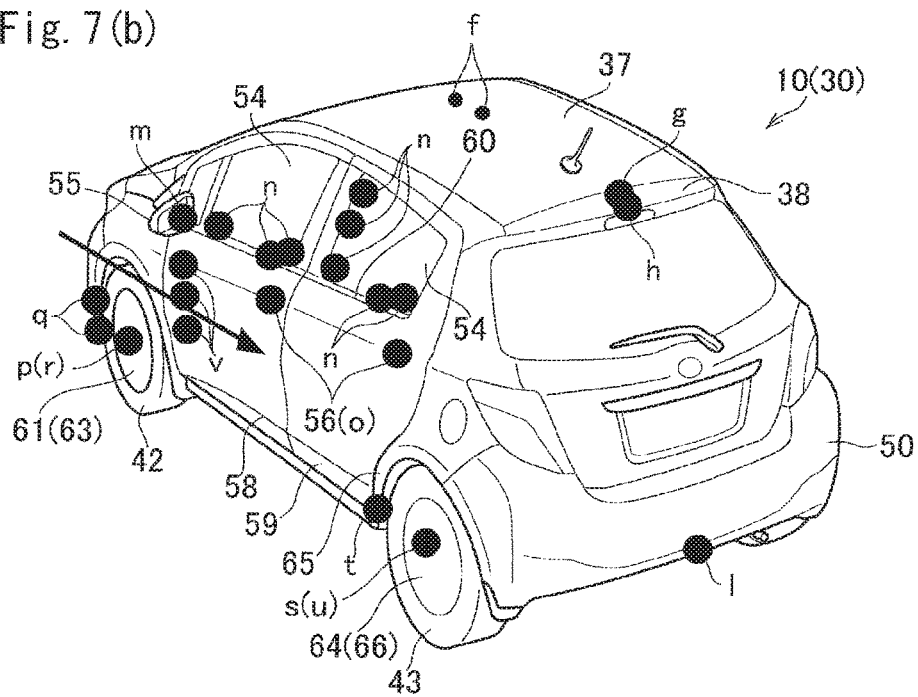

FIG. 7 is a perspective view of the vehicle 10 as a small hatchback car showing the points to which the self-discharge devices 31 are attached, and in FIG. 7, FIG. 7(*a*) is a perspective view of the vehicle 10 viewed from the front side and FIG. 7(*b*) is a perspective view of the vehicle 10 viewed from the rear side. In FIG. 7, "•" represents the point to which the self-discharge device 31 is attached. In the vehicle 10, the self-discharge devices 31 are arranged in such a manner as to prevent deterioration in aerodynamic characteristics in the pitching direction by preventing separation of airflow in the vertical direction. Specifically, the self-discharge devices 31 are arranged in such a manner as to decrease positive (+) potential on the width center of the vehicle 10. In order to prevent deterioration in aerodynamic characteristics in the pitching direction, the self-discharge device 31 may be arranged at least in the width center of the vehicle body 30. Instead, a plurality of the self-discharge devices 31 may also be arranged on both sides of the width center while keeping a predetermined clearance therebetween. In addition, in order to prevent a reduction in the vertical force applied to front wheels 42 as steering wheels by preventing separation of the airflow flowing along both right and left sides of the vehicle 10, it is preferable to arrange same number of the self-discharge devices 31 on both right and left sides of the vehicle 10 in addition to the width center. The points of the vehicle 10 to which the self-discharge devices 31 are attached to prevent deterioration in aerodynamic characteristics in the pitching direction, and an action of the self-discharge devices 31 thus arranged will be explained hereinafter.

In order to prevent separation of the airflow from a top face of a vehicle 30, according to the example shown in FIG. 7, the self-discharge devices 31 are attached to a front end of an engine hood 35 (indicated by "a"), a rear end of the engine hood 35 (indicated by "b"), a lower end of a windshield 36 (indicated by "c"), an upper end of the windshield 36 (indicated by "d"), a front end of a ceiling 37 (indicated by "e"), a front side of the ceiling 37 (indicated by "f"), a rear side of the ceiling 37 (indicated by "g"), a roof spoiler 38 (indicated by "h") and so on. If a wiper 39 is exposed on the outside of the vehicle 10, the airflow may be separated by the wiper 39. Therefore, it is preferable to attach the self-discharge devices 31 to a blade 40 and an arm 41 of the wiper 39 as indicated by "i" and "j". By thus arranging the self-discharge devices 31 on the top face of the vehicle 30 to discharge the positive (+) static electricity, the top face of the vehicle 30 can be prevented from being subjected to a negative pressure resulting from separation of the airflow from the top face of the vehicle 30. That is, a reduction in downforce pushing the vehicle body downwardly can be prevented to ensure desired vertical force applied to the front wheels 42 and rear wheels 43 toward the road surface.

Figure 8A:
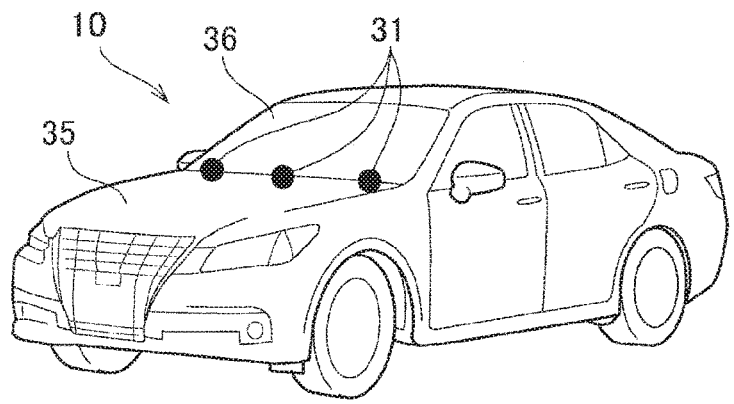
Figure 8B:
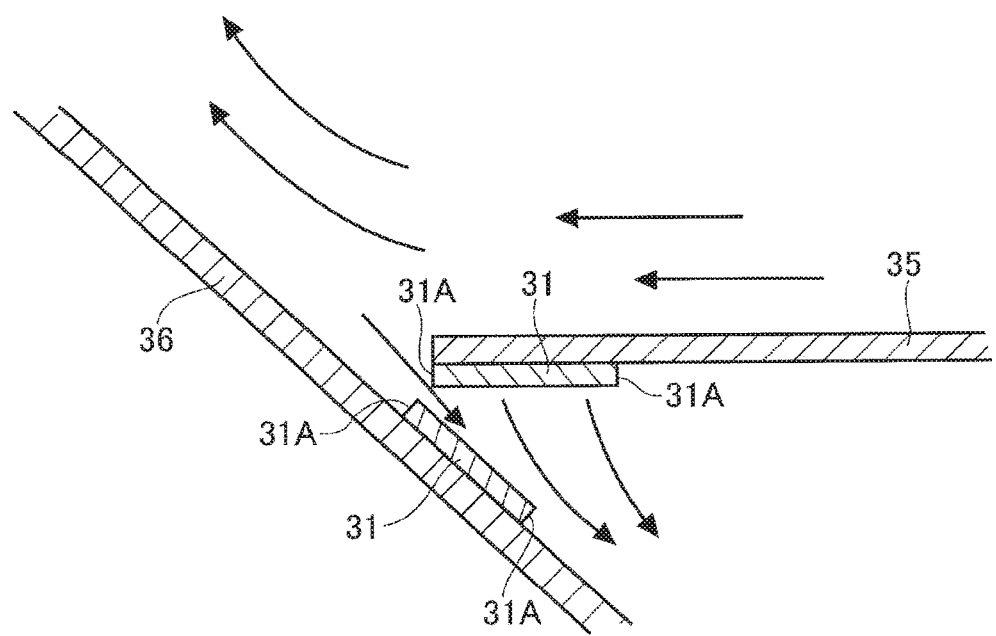

Turning to FIG. 8, there is shown an example in which the self-discharge devices 31 are attached to the lower end of the windshield 36 and to an inner surface of the engine hood 35 of the vehicle 10 as a sedan. In FIG. 8, FIG. 8(a) is a perspective view of the vehicle 10 viewed from the front side, and FIG. 8(b) is a cross-sectional view showing points on the windshield 36 and the engine hood 35 to which the self-discharge devices 31 are attached. The self-discharge device 31 has at least a certain thickness and hence the airflow may be disturbed by the self-discharge device 31 if the self-discharge device 31 is exposed to the airflow. In the example shown in FIG. 8, therefore, the self-discharge devices 31 are attached to the engine hood 35 and to the windshield 36 at the points not to be exposed to the airflow flowing along the outer surfaces of the engine hood 35 and the windshield 36. Specifically, the self-discharge devices 31 are attached to the outer surface of the windshield 36 at a point lower than the engine hood 35 in the vertical direction, and to the inner surface of the engine hood 35 at rear end. As illustrated in FIG. 8, a clearance is maintained between the engine hood 35 and the windshield 36, and hence the airflow flowing toward the windshield 36 is allowed to flow partially therethrough toward the self-discharge device 31 attached to the windshield 36 so that the positive (+) static electricity on the self-discharge device 31 and the surface of the vehicle body 30 in the vicinity of the self-discharge device 31 can be discharged.

By thus arranging the self-discharge devices 31, the positive (+) potentials of the lower end of the windshield 36 and the rear end of the engine hood 35 can be decreased so that repulsive force acting on the airflow flowing from the outer surface of the engine hood 35 toward the outer surface of the windshield 36 can be damped. For this reason, the top face of the vehicle 30 can be prevented from being subjected to a negative pressure resulting from separation of the airflow. That is, a reduction in downforce pushing the vehicle body downwardly can be prevented to ensure desired vertical force applied to the front wheels 42 and rear wheels 43 toward the road surface.

Figure 9:
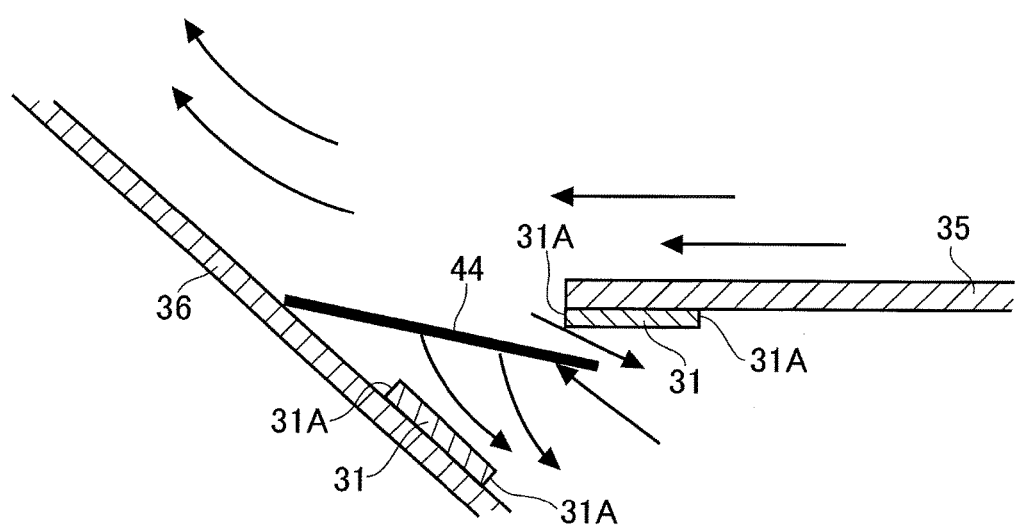
FIG. 9 is a cross-sectional view showing an airflow adjustment cover attached to the outer surface of the windshield to protect the self-discharge device attached to the lower side of the outer surface of the windshield.

As described, it is preferable to arrange the self-discharge device 31 close to the airflow. However, if the clearance between the engine hood 35 and the windshield 36 is too wide, aerodynamic characteristics of the airflow flowing along the windshield 36 may be changed for a variety of reasons, e.g., by an increase in a quantity of the air flowing into the engine room through the clearance. In the example shown in FIG. 9, therefore, an airflow adjustment cover 44 is attached to the outer surface of the windshield 36 above the self-discharge device 31 but lower than the engine hood 35 in the vertical direction so as to restrict the airflow to flow into the clearance between the engine hood 35 and the windshield 36. Specifically, the airflow adjustment cover 44 is a plate member, and a width of the airflow adjustment cover 44 is substantially identical to that to the windshield 36.

Figure 10A:
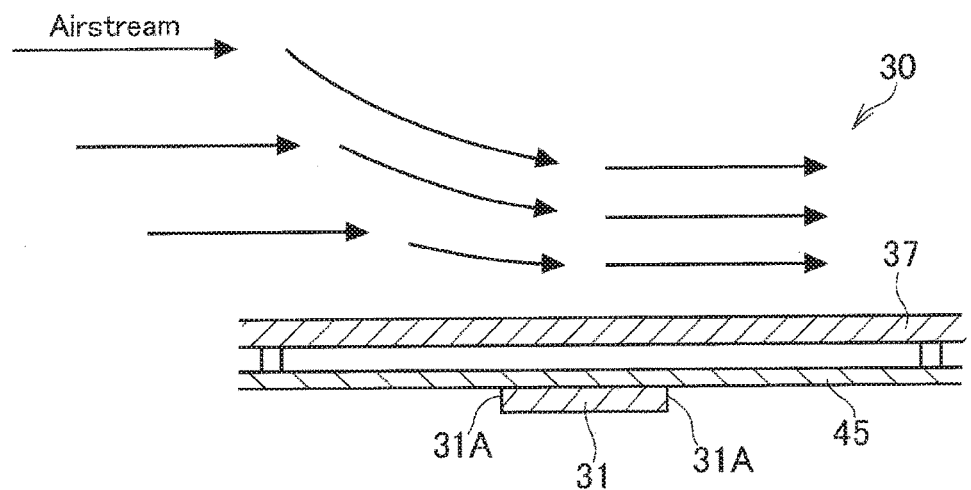

FIG. 10 is a cross-sectional view showing a point of the ceiling 37 to attach the self-discharge device 31 to discharge the static electricity on the ceiling 37. In the example shown in FIG. 10(a), a roof liner 45 made of resin is attached to an inner surface of the ceiling 37 while keeping a predetermined clearance therebetween. That is, a closed space is interposed between the ceiling 37 and the roof liner 45. As described, the self-discharge device 31 is adapted to decrease electric potential of the self-discharge device 31 itself and in the vicinity thereof by producing negative ions around the self-discharge device 31. If the self-discharge device 31 is arranged in the closed space between the ceiling 37 and the roof liner 45, the self-discharge device 31 may not function properly. According to the example shown in FIG. 10(a), therefore, the self-discharge device 31 is attached to an inner surface of the roof liner 45 facing to the vehicle interior. By thus attaching the self-discharge device 31 to the inner surface of the roof liner 45, the roof liner 45 is neutralized to decrease the potential thereof. Consequently, potential in the closed space is deceased so that potential of the ceiling 37 is decreased. That is, the self-discharge device 31 attached to the inner surface of the roof liner 45 decreases the potential of the ceiling 37 indirectly through the roof liner 45 and the air confined in the closed space. Consequently, separation of the airflow from the outer surface of the ceiling 37 can be prevented to prevent a reduction in the downforce pushing the vehicle body downwardly. For this reason, separation of the airflow from the ceiling 37 in the longitudinal direction can be prevented even when the vehicle makes a turn or receives crosswind to prevent change in aerodynamic characteristics in the yawing direction. Consequently, control stability and riding comfort can be improved.

Figure 10B:
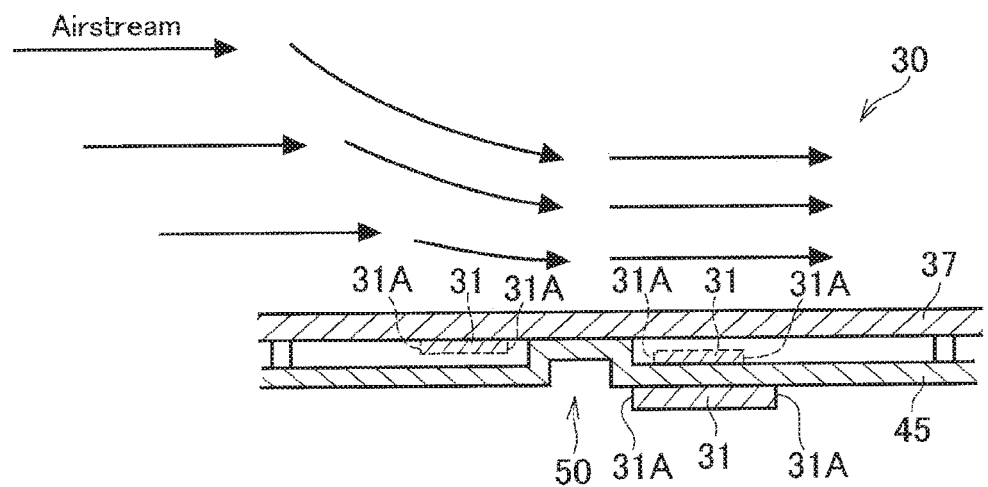

FIG. 10(b) is a cross-sectional view showing another example of neutralizing the ceiling 37. According to the example shown in FIG. 10(b), the roof liner 45 has a depression 45a that is brought into contact to the backside of the point of the ceiling at which separation of the airflow occurs, and the self-discharge device 31 the attached to the inner surface of the roof liner 45 in the vicinity of the depression 45a to decrease the positive potential of the depression 45a. In this case, the positive potential of the ceiling 37 can be decreased directly without neutralizing the air confined in the closed space by decreasing the positive potential of the depression 45a by the self-discharge device 31. Consequently, separation of the airflow from the outer surface of the ceiling 37 can be prevented to prevent a reduction in the downforce pushing the vehicle body downwardly. For this reason, separation of the airflow from the ceiling 37 in the longitudinal direction can be prevented even when the vehicle makes a turn or receives crosswind to prevent change in aerodynamic characteristics in the yawing direction. Consequently, control stability and riding comfort can be improved. If the space between the ceiling 37 and the roof liner 45 is not closed, the self-discharge device 31 may also be attached to an upper face (facing to the ceiling 37) of the roof liner 45 and to the inner face of the ceiling 37 as depicted by a dashed line in FIG. 10(*b*).

Figure 11A:
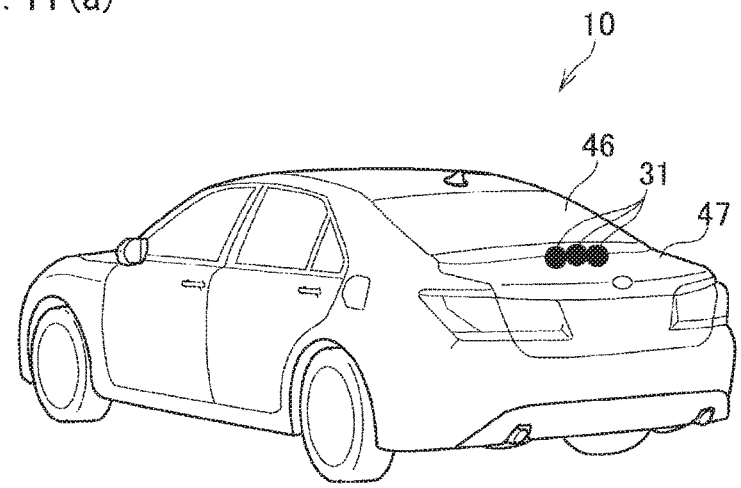
Figure 11B:
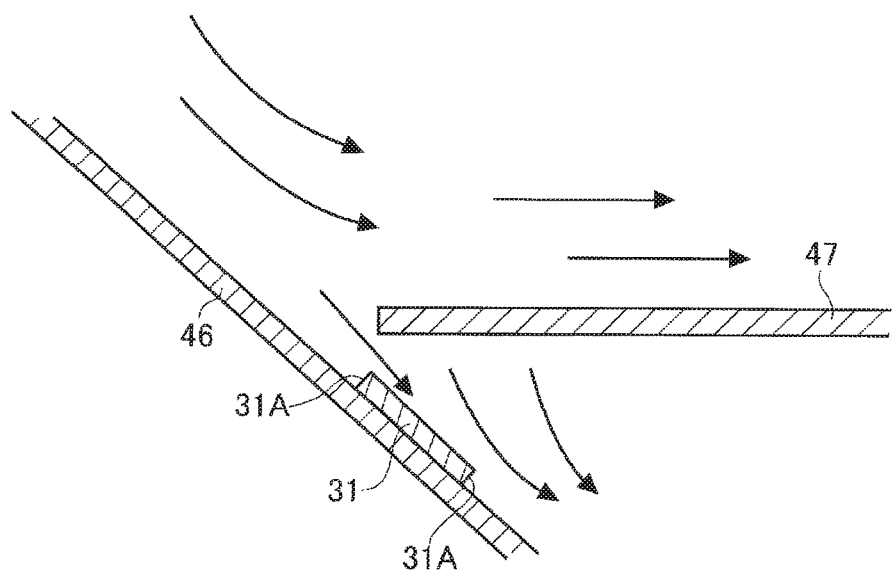

As illustrated in FIG. 11, in the sedan type vehicle 10, a clearance is also interposed between a rear window 46 and a trunk lid 47. In order to decrease positive (+) potential of the rear window 46, as the example shown in FIG. 8, the self-discharge device 31 may be attached to a lower end of the rear window 46. Specifically, the self-discharge device 31 is attached to an outer surface of the rear window 46 at a point lower than an outer surface of the trunk lid 47 in the vertical direction. By thus decreasing the positive (+) potential of the rear window 46 by neutralizing the positive (+) static electricity by the self-discharge device 31, separation of the airflow from the rear window 46 can be prevented. Consequently, a reduction in downforce pushing the vehicle body downwardly can be prevented to ensure desired vertical force applied to the front wheels 42 and rear wheels 43 toward the road surface.

Figure 12A:
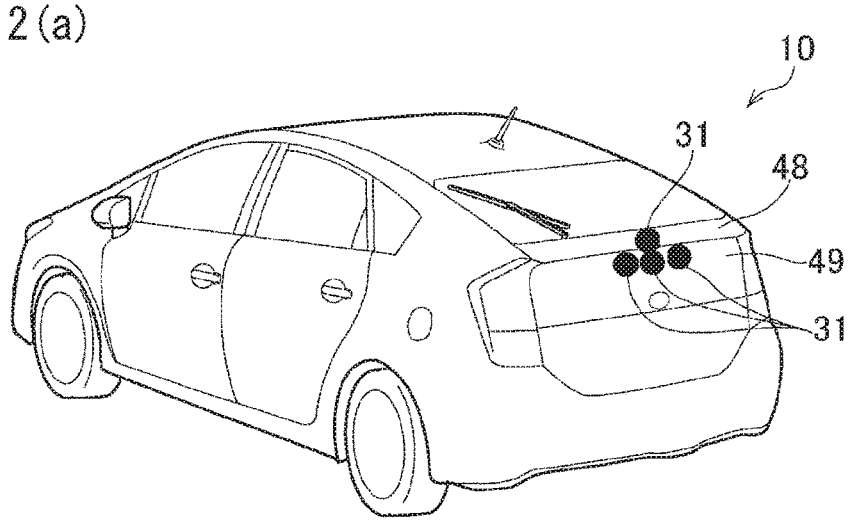
Figure 12B:
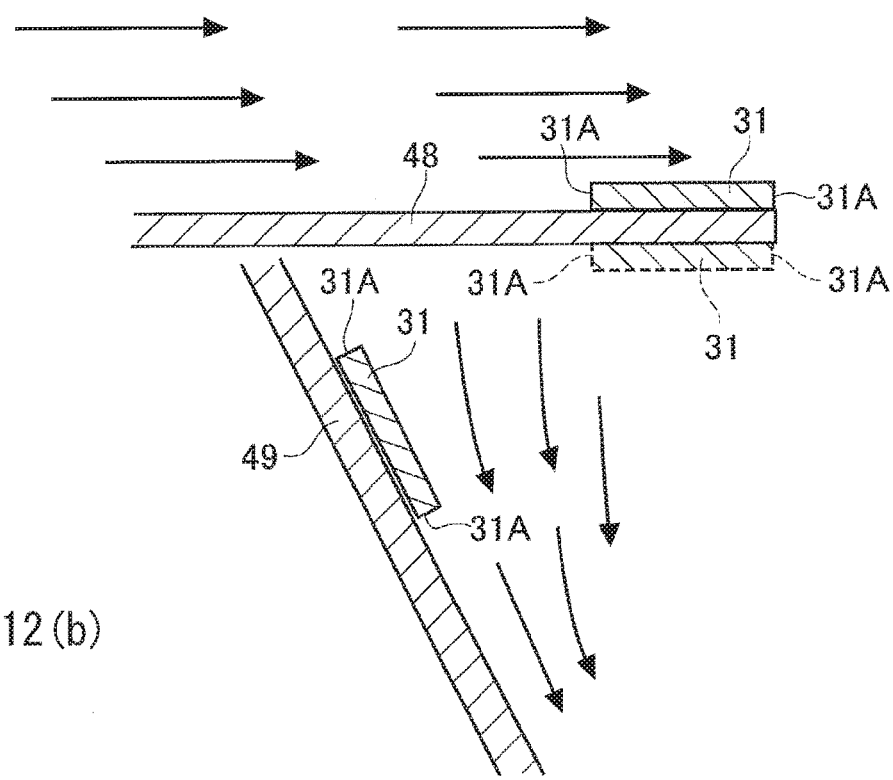

Turning to FIG. 12, there are shown positions of the self-discharge devices 31 attached to a rear spoiler 48 and a rear glass 49. In FIG. 12, FIG. 12(*a*) is a perspective view of a hatchback type vehicle 10 viewed from the rear side, and FIG. 12(*b*) is a cross-sectional view showing points on the rear spoiler 48 and the rear glass 49 to which the self-discharge devices 31 are attached. According to the example shown in FIG. 12, the self-discharge device 31 is attached to an outer surface of the rear spoiler 48 to decrease positive (+) potential of the self-discharge devices 31 by neutralizing the positive (+) static electricity. Optionally, in order not to disturb the airflow, the self-discharge device 31 may also be attached to an inner surface of the rear spoiler 48 as depicted by a dashed line in FIG. 12(*b*) depending on condition.

Figure 13A:
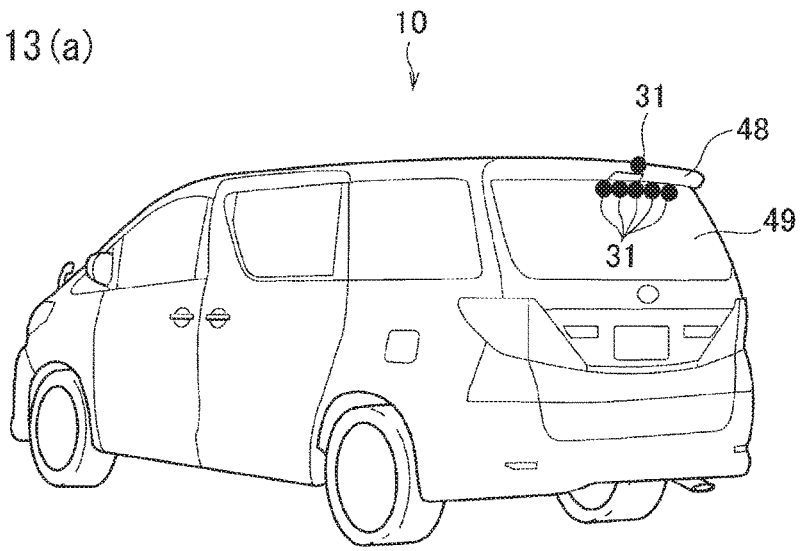
Figure 13B:
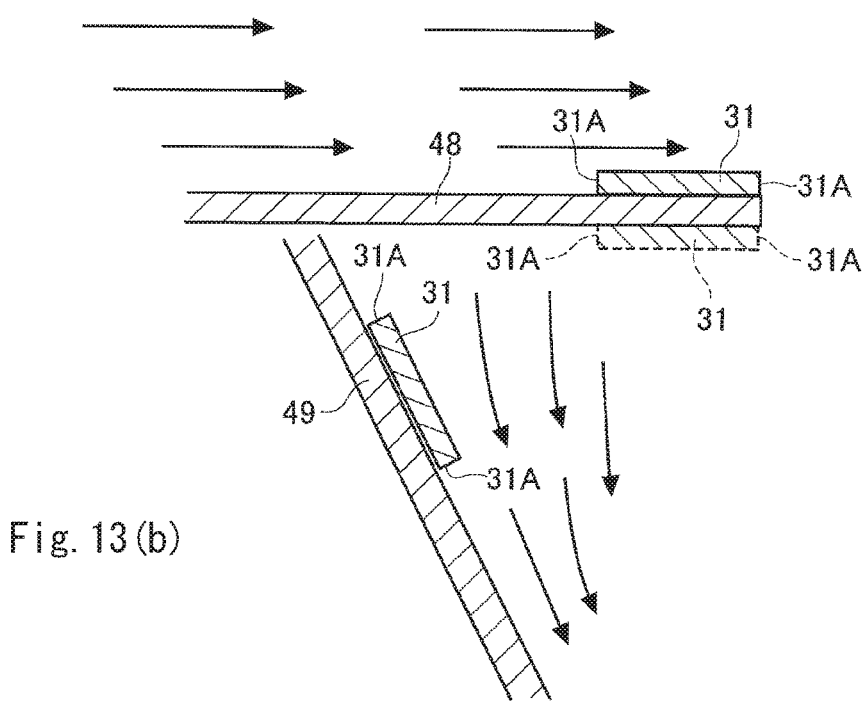

In the example shown in FIG. 12, the rear glass 49 is formed downwardly from a base portion of the rear spoiler 48. During propulsion of the vehicle, the airflow flowing along the vehicle body 30 does not flow along a surface of the rear glass 49. However, if the airflow is isolated from the rear glass 49, the airflow flowing on the rear section of the vehicle 10 may be disturbed to disturb the airflow flowing along the vehicle body 30 indirectly during propulsion. According to the example shown in FIG. 12(*b*), therefore, the self-discharge device 31 is also attached to the rear glass 49 to decrease the positive (+) static electricity. Specifically, the self-discharge device 31 is attached to an upper portion of the outer surface of the rear glass 49. Turning to FIG. 13, there is shown a one-box type vehicle 10 viewed from the rear side, and the self-discharge devices 31 are also attached to the rear spoiler 48 and to the rear glass 49. Specifically, as depicted in a cross-sectional view shown in FIG. 13(*b*), the self-discharge devices 31 are attached to the outer surface or the inner surface of the rear spoiler 48, and to the upper portion of the outer surface of the rear glass 49.

As described, the self-discharge devices 31 are arranged on the width center of the vehicle 10 in such a manner as to prevent a change in the aerodynamic characteristics in the pitching direction. The points to which the self-discharge devices 31 are not limited to the foregoing examples. For example, as indicated by "f", the self-discharge devices 31 may also be attached to the front section of the ceiling 37 at the width center while keeping predetermined intervals along the flowing direction of the airflow. By thus arranging a plurality of the self-discharge devices 31 along the flowing direction of the airflow, separation of the airflow from the vehicle body 30 can be prevented certainly.

In addition, in the vehicle 10 shown in FIG. 7, the self-discharge devices 31 are attached to a rear end portion of the front bumper 14 (indicated by "k"), a rear fuel tank (to be mentioned below), a lower face of a rear trunk (not shown) attached to a floor of the vehicle body 30, a lower end portion of a rear bumper 50 (indicated by "l") and so on to prevent separation of the airflow. By thus arranging the self-discharge devices 31 to discharge the positive (+) static electricity of the lower face of the vehicle body 30, separation of the airflow from the lower face of the vehicle body 30 can be prevented. For this reason, an occurrence of Kármán vortex street will not be caused by separation of airflow from the lower face of the vehicle body 30 so that an increase in pressure applied to the lower face of the vehicle body 30 can be prevented. Consequently, a reduction in downforce pushing the vehicle body downwardly can be prevented to ensure desired vertical force applied to the front wheels 42 and rear wheels 43 toward the road surface.

Figure 14:
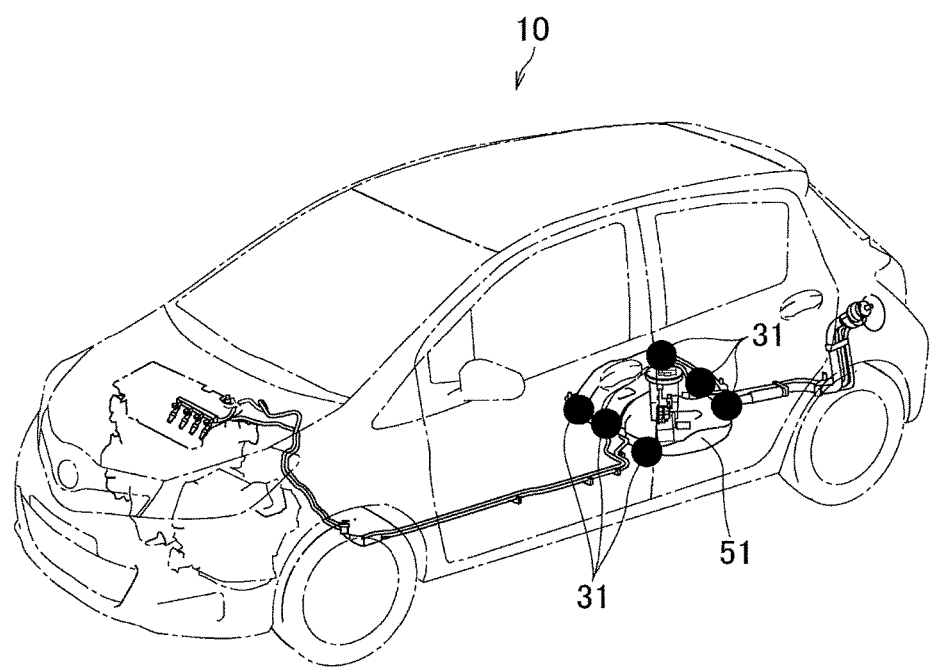
FIG. 14 is an explanatory illustration showing locations of the self-discharge devices attached to a rear fuel tank.

Turning to FIG. 14, there is shown an arrangement of the self-discharge devices 31 attached to the rear fuel tank 51. If an undercover for reducing a flow resistance is not arranged on the lower face of the vehicle body 30, the rear fuel tank 51 is exposed from the lower face of the vehicle 10. If the rear fuel tank 51 is electrically charged, the airflow flowing along the rear fuel tank 51 may be separated to increase a pressure applied to the lower face of the vehicle body 30. According to the example shown in FIG. 14, therefore, the self-discharge devices 31 are attached to a front section and a rear section of the rear fuel tank 51 in a travelling direction of the vehicle 10.

Figure 15A:
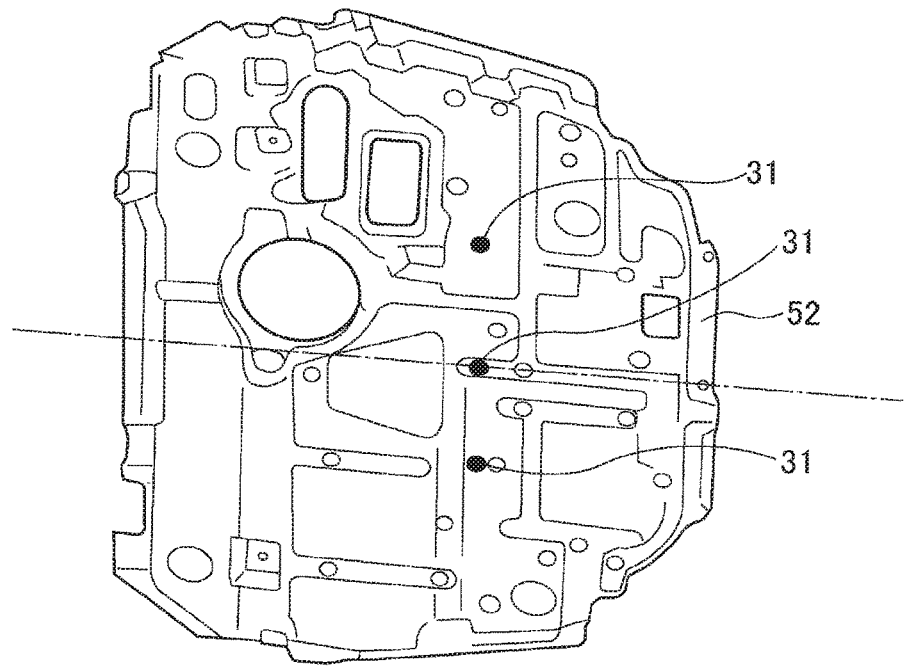
FIG. 15(a) is an explanatory illustration showing locations of the self-discharge devices attached to an undercover viewed from a lower side of the vehicle.
Figure 15B:
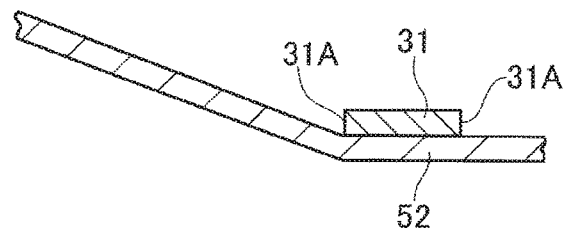
FIG. 15(b) is a cross-sectional view thereof.

In order to reduce the flow resistance on the lower face of the vehicle body 30, an undercover 52 may be attached to the lower face of the vehicle body 30. Turning to FIG. 15, there is shown an example of the undercover 52 attached to a lower face of the engine room. In FIG. 15, FIG. 15(*a*) is a plan view of the undercover 52 viewed from a lower side of the vehicle 10, and FIG. 15(*b*) is a cross-sectional view showing a point to which the self-discharge device 31 is attached. Specifically, in FIG. 15, the left side is a front side of the vehicle 10, and the dashed-dotted line represents the width center of the vehicle 10. In order not to be hit by a bump on a road when overcoming the bump, a front side of the undercover 52 is inclined upwardly. That is, as shown in FIG. 15(*b*), the airflow flowing from the front side of the undercover 52 may be separated at a folding point of the undercover 52. According to the example shown in FIG. 15, therefore, the self-discharge device 31 is attached to the folding point of the undercover 52 or in the vicinity thereof to decrease the static electricity of the folding point. Specifically, the self-discharge devices 31 are attached to an inner surface of the undercover 52 at the width center of the vehicle body 30 and both right and left sides of the width center symmetrically. Here, it is preferable to individually maintain a distance between each of the self-discharge devices 31 of right and left sides and the self-discharge device 31 situated at the width center approximately 150 to 200 mm.

Figure 16A:
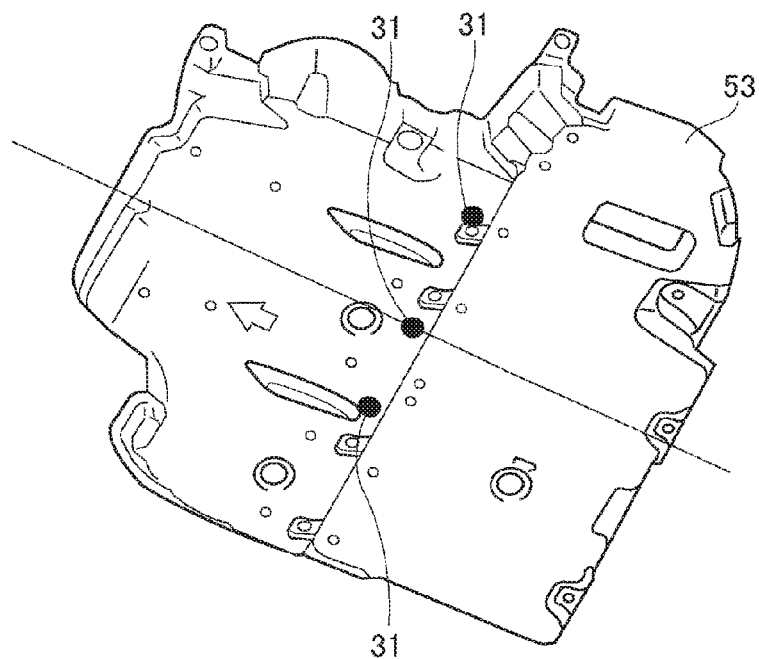
FIG. 16(a) is an explanatory illustration showing locations of the self-discharge devices attached to a rear diffuser viewed from the lower side of the vehicle.
Figure 16B:
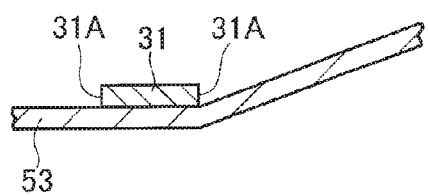
FIG. 16(b) is a cross-sectional view thereof.

If a rear diffuser 53 is arranged on the lower face of the vehicle body 30 to control the airflow, the self-discharge device 31 may also be attached to the rear diffuser 53. In FIG. 16, FIG. 16(*a*) is a plan view showing the rear diffuser 53 viewed from the lower side of the vehicle 10, and FIG. 16(*b*) is a cross-sectional view showing a point to which the self-discharge device 31 is attached. Specifically, in FIG. 16, the right side is a rear side of the vehicle 10, and the dashed-dotted line represents the width center of the vehicle 10. In order not to increase a flow rate of the airflow flowing along the lower face of the vehicle body 30 toward the rear side, a rear side of the rear diffuser 53 is inclined upwardly. That is, as shown in FIG. 16(b), the airflow flowing from the front side of the rear diffuser 53 may be separated at a folding point of the rear diffuser 53. According to the example shown in FIG. 16, therefore, the self-discharge device 31 is attached to the folding point of the rear diffuser 53 or in the vicinity thereof to decrease the static electricity of the folding point. Specifically, the self-discharge devices 31 are attached to an inner surface of the rear diffuser 53 at the width center of the vehicle body 30 and both right and left sides of the width center symmetrically. Here, it is preferable to individually maintain a distance between each of the self-discharge devices 31 of right and left sides and the self-discharge device 31 situated at the width center approximately 150 to 200 mm.

As described, separation of airflow can be prevented by discharging positive (+) static electricity of the upper face and the lower face of the vehicle body 30 to decrease positive (+) potential thereof, thereby preventing deterioration in aerodynamic characteristics in the pitching direction of the vehicle body 30. For this reason, change in the vertical force applied to the front wheels 42 and rear wheels 43 can be prevented to ensure acceleration performance, turning performance, and steering stability.

If the airflow flowing along the side face of the vehicle body 30, aerodynamic characteristics in the rolling direction and the yawing direction may be changed. In the example shown in FIG. 7, therefore, the self-discharge devices 31 are also attached to symmetrical points in the width direction across the width center to prevent separation of the airflow from the side faces of the vehicle body 30. Points of the self-discharge device 31 to prevent change in aerodynamic characteristics in the rolling direction and the yawing direction and an effect to be achieved will be described hereinafter.

For example, the self-discharge devices 31 may be attached in a symmetrical manner to side windows 54, rear view mirrors 55, door handles 56, the front wheels 42, the rear wheels 43, a fender 57 and so on. In the example shown in FIG. 7, specifically, the self-discharge devices 31 are attached to a projection of a base member of the rear view mirrors 55 (indicated by "m"), the side window 54 at a level not to block view, e.g., at a level of a belt mall 60 preventing intrusion of water into a front door 58 and a rear door 59 (indicated by "n"), the door handle 56, (indicated by "o"), a rotational center of a wheel 61 of the front wheel 42, (indicated by "p"), a side face of the front bumper 14 or a front fender 62 at a level of the rotational center of the wheel 61 of the front wheel 42 and at a point of upstream side of the airflow (indicated by "q"), a rotational center of a wheel cap 63 fitted onto the wheel 61 of the front wheel 42 (indicated by "r"), a rotational center of a wheel 64 of the rear wheel 43, (indicated by "s"), the rear door 59 or a rocker panel 65 at a level of the rotational center of the wheel 64 of the rear wheel 43 in an upstream side of the airflow (indicated by "t"), a rotational center of a wheel cap 66 fitted onto the wheel 64 of the rear wheel 43 (indicated by "u"), and a front section of the front door 58 (indicated by "v").

Figure 17:
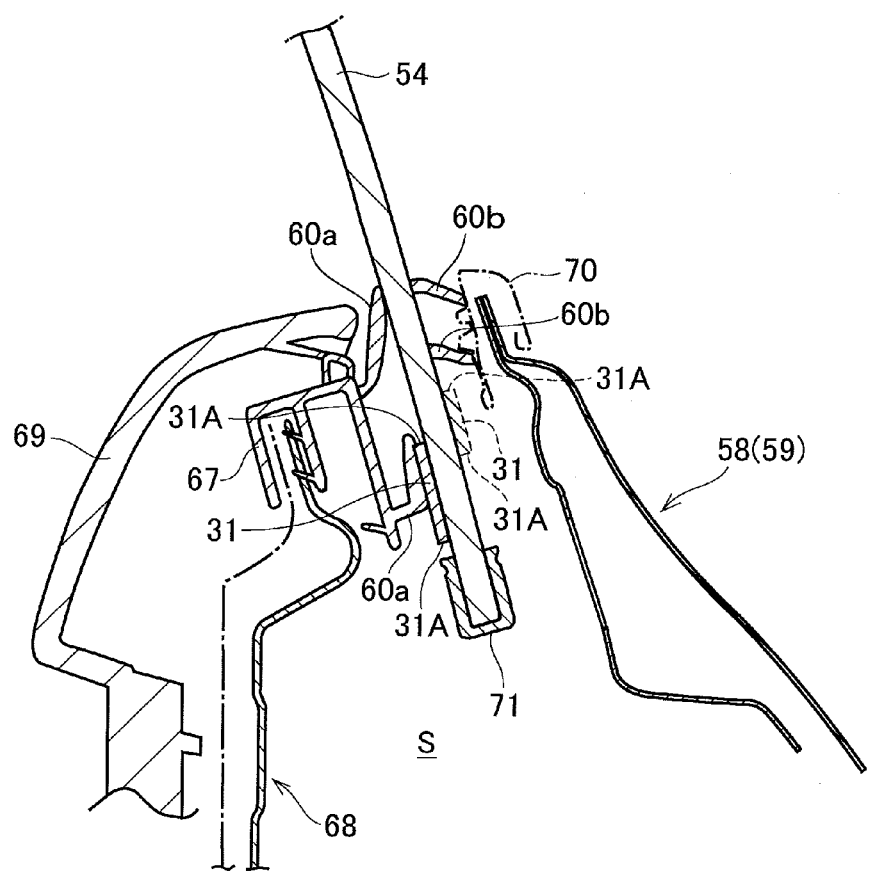
FIG. 17 is a cross-sectional view showing locations of the self-discharge devices attached to a lower side of a side window to be protected from the airflow flowing along the vehicle surface.

FIG. 17 is a cross-sectional view showing locations of the self-discharge device 31 arranged between the front door 58 or the rear door 59 and the belt mall 60. According to the example shown in FIG. 17, a belt mall 60a of interior side is connected to a frame 68 through a clip 67, and the clip 67 is also connected to a door trim 69. Meanwhile, a belt mall 60b of exterior side is connected through a clip 70 to the front door 58 or the rear door 59 connected to a not shown another frame. The belt mall 60 is adapted to prevent intrusion of water on the side window 54 into a clearance between the door trim 69 and the front door 58 or the rear door 59 (as will be called the "door pocket" S hereinafter). To this end, the belt mall 60a and the belt mall 60b are individually made of resin material, and the belt mall 60a and the belt mall 60b are arranged closely to the side window 54 on the interior side and the exterior side. According to the example shown in FIG. 17, each of the belt mall 60a and the belt mall 60b are individually connected to the clip 67 and the clip 70 while keeping a predetermined distance in the vertical direction.

A lower end of the side window 54 is held by a holding member 71 having a U-shaped cross-sectional shape. Specifically, the holding member 71 is arranged in the door pocket S in such a manner as to be reciprocated by a not shown motor. That is, the side window 54 is held in the door pocket S by moving the holding member 71 downwardly.

The self-discharge device 31 is attached to the lower end of the side window 54 to discharge the positive (+) static electricity of the side window 54. Specifically, the self-discharge device 31 is attached to the side window 54 at a point where the self-discharge device 31 is allowed to remain within the door pocket S even if side window 54 is moved to the uppermost position. An upper end of the belt mall 60 is protruded from the door trim 69 and the front door 58 or the rear door 59 to be exposed on the outside of the vehicle 10 to the airflow. Therefore, it is preferable to neutralize the positive (+) static electricity of the belt mall 60. For this purpose, according to the example shown in FIG. 17, the point of the side window 54 to which the self-discharge device 31 is attached is determined in such a manner that the self-discharge device 31 is brought into contact to the lower belt mall 60a of interior side when the side window 54 is moved to the uppermost position. Alternatively, the self-discharge device 31 is attached to the lower belt mall 60a of interior side to be always brought into contact to the side window 54 and the lower belt mall 60a irrespective of the vertical position of the side window 54.

By thus attaching the self-discharge device 31 to the side window 54 or to the belt mall 60a of interior side, the positive (+) static electricity of the side window 54 and the belt mall 60 can be discharged to prevent separation of the airflow along the side window 54. In addition, since the self-discharge device 31 is arranged in the door pocket S, the positive (+) static electricity of the side window 54 and the belt mall 60 may also be discharged to the air in the door pocket S. In the example shown in FIG. 17, although the self-discharge device 31 is attached to the inner surface of the side window 54, the self-discharge device 31 may also be attached to the outer surface of the side window 54.

Thus, the example shown in FIG. 17 is configured to discharge the positive (+) static electricity of the side window 54 and the belt mall 60 arranged at the lower edge of the frame of the front door 58 or the rear door 59. Optionally, as shown in FIG. 7, the self-discharge device 31 may also be attached to the inner surface of the belt mall 60.

Figure 18:
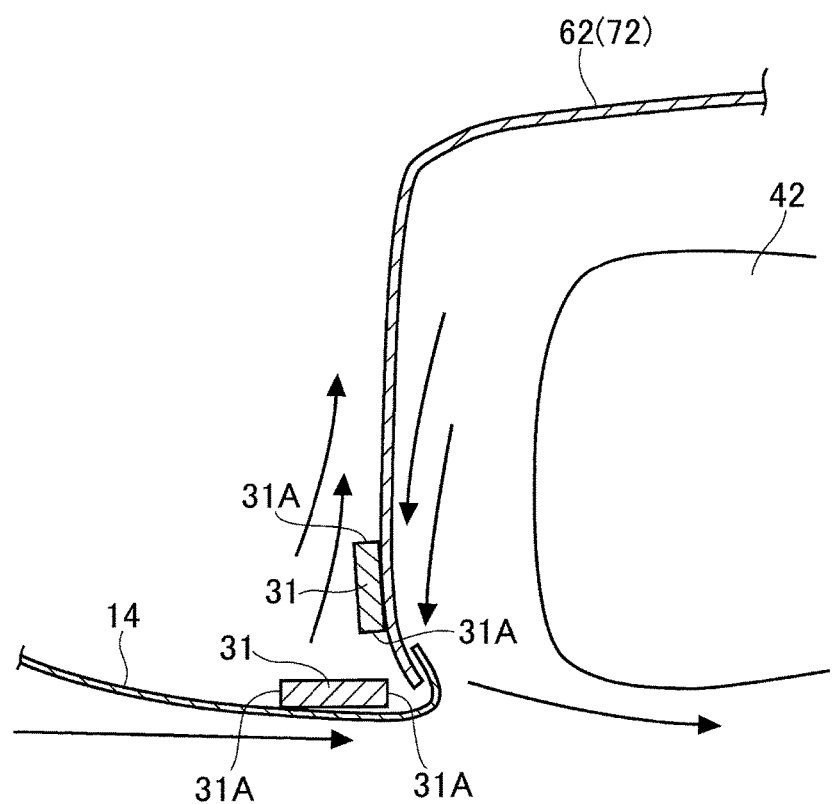
FIG. 18 is a cross-sectional view showing locations of the self-discharge devices attached to a side end of a front liner to be protected from the airflow flowing along the vehicle surface and to a rear end of a front bumper from which the airflow is separated.

Turning to FIG. 18, there is shown an example of attaching the self-discharge device 31 to the front bumper 14 and the front fender 62. In FIG. 18, specifically, the lower side is the left side of the vehicle 10 in the width direction, and the left side is the front side of the vehicle 10. As shown in FIG. 18, the airflow flowing along the side face of the front bumper 14 further flows along the front wheel 42. Consequently, the side face of the front bumper 14 in the width direction is subjected to the negative pressure between the front fender 62 and the front wheel 42 in the longitudinal direction of the vehicle 10, and hence the airflow is aspirated outwardly widthwise from a fender housing to be discharged from the fender housing smoothly. Therefore, if the airflow is separated from the fender housing at an undesirable point, the airflow may be prevented to be aspirated outwardly widthwise from the fender housing.

According to the example shown in FIG. 18, therefore, the self-discharge devices 31 are attached to a backside of the outer surface of the front bumper 14, and to an opposite face of the front fender 62 or a fender liner 72 to the fender housing. Additionally, it is preferable to arrange the self-discharge devices 31 at a level of the rotational center of the front wheel 42 in the vertical direction. By thus arranging the self-discharge device 31, the airflow flowing along the side face of the front bumper 14 can be prevented from being separated from the front bumper 14 at the undesirable point. That is, the air taken into the fender housing to cool the brake applying a braking force to the front wheel 42 can be certainly aspirated outwardly widthwise. For this reason, reduction in flow rate of the airflow flowing within the fender housing can be prevented.

The door handle 56 may be formed into a hollow structure for the sake of manufacturing. If the door handle 56 is formed into the hollow structure, it is preferable to arrange the self-discharge device 31 in the hollow portion of the door handle 56. Otherwise, if the door handle 56 is formed in such a manner as to have a U-shaped cross-section, in other words, if a slit is formed on the door handle 56, it is preferable to attach the self-discharge device 31 to the slit.

Thus, separation of the airflow from the side face of the vehicle 30 can be prevented by attaching the self-discharge devices 31 to any of the symmetrical points. That is, it is possible to prevent a change in the aerodynamic characteristics in the rolling direction and the yawing direction resulting from separation of the airflow from any of the side faces. Especially, it is possible to prevent a change in the aerodynamic characteristics in the rolling direction and the yawing direction resulting from separation of the airflow from the side face of an inner side in a turning direction. For this reason, deterioration in the travelling performance such as the control stability can be prevented.

Figure 19:
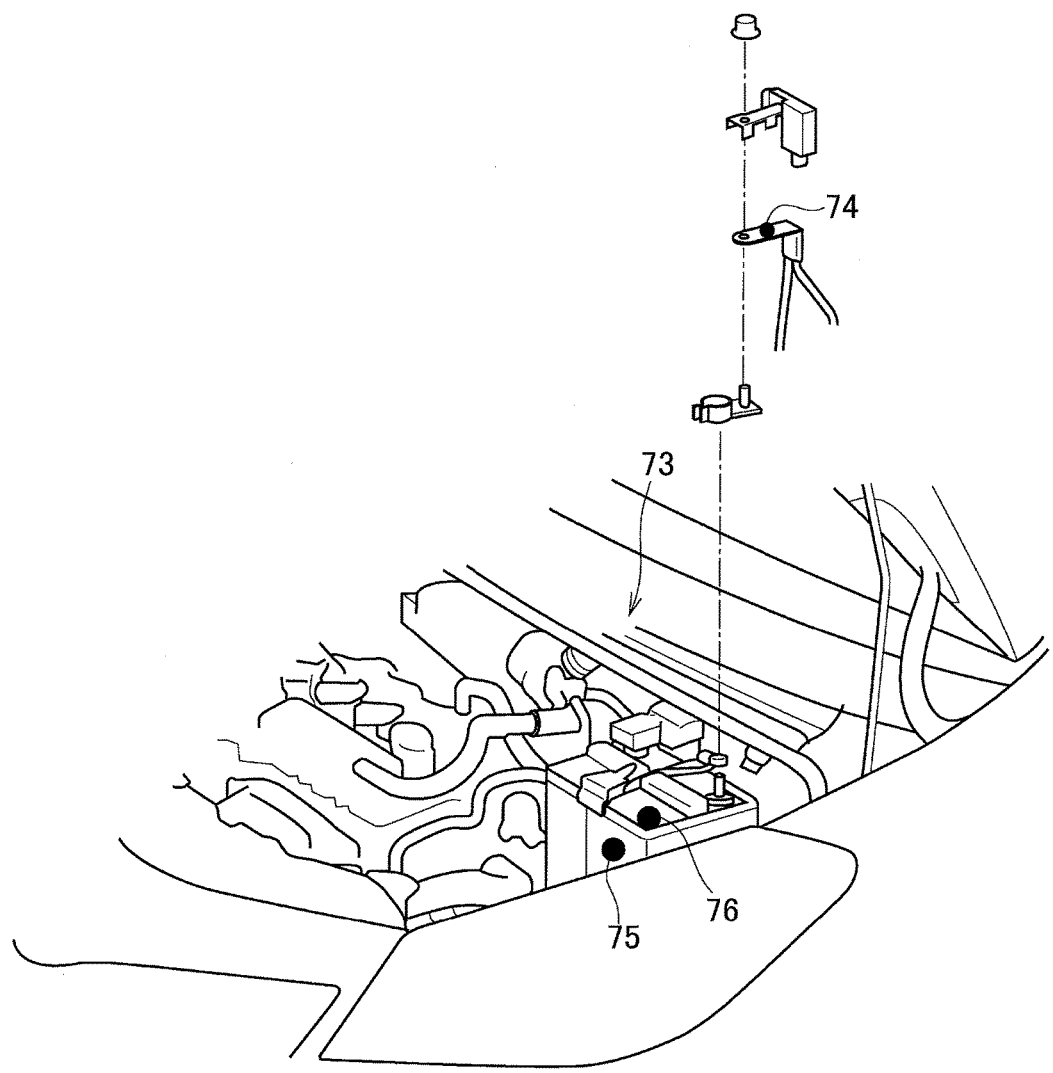
FIG. 19 is a perspective view showing locations of the self-discharge devices attached to a minus terminal of a battery in an engine room connected to the vehicle body and to a case of the battery.

Each member is individually fixed to a frame, and the frame is electrically connected to a grounding portion (i.e., the minus terminal) of the battery. That is, the positive (+) static electricity of each member of the vehicle body 30 can be decreased by decreasing potential of the frame. To this end, according to the example shown in FIG. 19, the self-discharge device 31 is attached to the minus terminal 74 of the battery 73 to decrease negative (−) potential of the minus terminal 74. Optionally, the self-discharge devices 31 may also be attached to a casing 75 and a lid 76 of the battery 73. Basically, the battery 73 is arranged in the engine room, and external air is taken into the engine room flows in the engine room to cool the engine. Therefore, as described, the static electricity can be discharged from the self-discharge device 31 by corona discharge.

REFERENCE SIGNS LIST

10: vehicle; 12: conductive sheet 12 (potential decreasing member; 12A: edge; 14: bumper cover (resin member, exterior component); 16: rear view mirror (exterior component); 18: head lamp (exterior component); 30 vehicle body; 35: engine hood; 36: windshield; 37: ceiling; 38: roof spoiler; 39: wiper; 42: front wheel; 43: rear wheel; 45: roof liner; 46: rear window; 47: trunk lid; 48: rear spoiler; 49: rear glass; 50: rear bumper; 51: rear fuel tank; 52: undercover (front undercover); 53: rear diffuser; 54: side window; 55: rear view mirror; 56: door handle; 57: fender; 58: front door; 59: rear door; 60: belt mall; 61, 64: wheel; 62: front fender; 63, 66: wheel cap; 65: rocker panel; 72: fender liner; 73: battery; 74: minus terminal; 75: casing; 76: lid.

The invention claimed is:

1. A vehicle, in which positive static charges accumulate on a vehicle body insulated from a road surface during propulsion of the vehicle, comprising:
   a self-discharge device that is adapted to decrease a positive potential of at least one of specific portions of the vehicle body determined in advance at which positively charged airflow flowing along a vehicle surface of the specific portions of the vehicle body deviates therefrom and control stability of the vehicle can be improved by preventing separation of the positively charged airflow, during propulsion of the vehicle, by discharging static electricity to produce negative ions according to the positive potential of the specific portions of the vehicle body, wherein
   the specific portions include a part of a member made of resin material
   the self-discharge device includes a potential decreasing member adapted to cause a self-discharge according to energy of positive static electricity on the specific portions and in the vicinity thereof,
   the potential decreasing member is attached to the specific portions of the vehicle body at which the positively charged airflow flowing along the vehicle surface deviates therefrom,
   the potential decreasing member includes a conductive metal sheet having a sharp edge or a protrusion to cause the self-discharge, and
   the potential decreasing member is attached to a backside of an outer surface of the vehicle body to be exposed to the airflow flowing thereon.

2. The vehicle as claimed in claim 1, wherein the specific portions include a center part in a width direction of the vehicle body on at least one of an inner surface and an outer surface of the vehicle body.

3. The vehicle as claimed in claim 2, wherein the specific portions include any pair of parts that are bilaterally symmetrical with respect to the center part in the width direction of the vehicle body.

4. The vehicle as claimed in claim 1, wherein the specific portions include a plurality of parts situated keeping predetermined intervals along a flowing direction of the airflow.

5. The vehicle as claimed in claim 1,
   wherein the specific portions include a grounding portion of a battery; and
   wherein the self-discharge device is adapted to decrease negative potential of the grounding portion.

6. A manufacturing method of a vehicle in which positive static charges accumulate on a vehicle body insulated from a road surface during propulsion of the vehicle, comprising:
   determining a portion at which control stability of the vehicle can be improved by preventing separation of positively charged airflow flowing along a vehicle surface of the vehicle body during propulsion of the vehicle; and
   attaching a self-discharge device that is adapted to decrease a positive potential to said portion by discharging static electricity to produce negative ions according to the positive potential of said portion, wherein the specific portion includes a part of a member made of resin material, the self-discharge device includes a potential decreasing member adapted to cause a self-discharge according to energy of positive static electricity on the specific portion and in the vicinity thereof, the potential decreasing member is attached to the specific portion of the vehicle body at which the positively charged airflow flowing along the vehicle surface deviates therefrom, the potential decreasing member includes a conductive metal sheet having a sharp edge or a protrusion to cause the self-discharge, the potential decreasing member is attached to a backside of an outer surface of the vehicle body to be exposed to the airflow flowing thereon.

7. The manufacturing method of a vehicle as claimed in claim 6, wherein the portion at which control stability of the vehicle can be improved by preventing separation of positively charged airflow flowing along the vehicle surface during propulsion of the vehicle is determined at a center part in a width direction of the vehicle body on at least one of an inner surface and an outer surface of the vehicle body.

8. The manufacturing method of a vehicle as claimed in claim 6, wherein the portion at which control stability of the vehicle can be improved by preventing separation of positively charged airflow flowing along the vehicle surface during propulsion of the vehicle is determined at symmetrical portions in a width direction across the width center of the vehicle.

9. The manufacturing method of a vehicle as claimed in claim 6, wherein a plurality of the self-discharge devices are attached to the vehicle body while keeping predetermined intervals along a flowing direction of the airflow.

* * * * *